(12) United States Patent
McAdams et al.

(10) Patent No.: US 10,729,283 B2
(45) Date of Patent: Aug. 4, 2020

(54) COOKING GRILL USING PELLET FUEL

(71) Applicant: Crystal Spring Colony Farms Ltd., Ste. Agathe (CA)

(72) Inventors: Tom McAdams, Ste. Agathe (CA); Ethan Hofer, Ste. Agathe (CA); Lucien Dnestrianschii, St. Albert (CA)

(73) Assignee: Crystal Spring Colony Farms Ltd., Ste. Agathe, MB (CA)

( * ) Notice: Subject to any disclaimer, the term of this patent is extended or adjusted under 35 U.S.C. 154(b) by 127 days.

(21) Appl. No.: 16/170,294

(22) Filed: Oct. 25, 2018

(65) Prior Publication Data

US 2019/0133374 A1    May 9, 2019

Related U.S. Application Data

(63) Continuation-in-part of application No. 15/677,793, filed on Aug. 15, 2017, now Pat. No. 10,426,295,
(Continued)

(51) Int. Cl.
| | |
|---|---|
| *A47J 37/07* | (2006.01) |
| *F24B 1/19* | (2006.01) |
| *F24C 1/04* | (2006.01) |
| *F24B 1/08* | (2006.01) |
| *F23B 40/04* | (2006.01) |

(Continued)

(52) U.S. Cl.
CPC ....... *A47J 37/0763* (2013.01); *A47J 37/0713* (2013.01); *F23B 20/00* (2013.01); *F23B 40/04* (2013.01); *F23B 40/08* (2013.01); *F23B 60/02* (2013.01); *F23C 1/04* (2013.01); *F24B 1/08* (2013.01); *F24B 1/19* (2013.01);
(Continued)

(58) Field of Classification Search
CPC .......... F23B 20/00; F23B 60/02; F23B 40/08; F23B 40/04; F23B 2900/00001; F24B 1/08; F24B 1/19; F24C 1/04; A47J 37/0763; A47J 37/0713; F23C 1/04; F23N 2237/02; F23N 2237/08
See application file for complete search history.

(56) References Cited

U.S. PATENT DOCUMENTS

| | | | | |
|---|---|---|---|---|
| 5,251,607 | A * | 10/1993 | Traeger ............... | A47J 37/0704 |
| | | | | 126/108 |
| 6,223,737 | B1 * | 5/2001 | Buckner .................. | F23B 1/38 |
| | | | | 110/108 |

(Continued)

*Primary Examiner* — Alfred Basichas
(74) *Attorney, Agent, or Firm* — Adrian D. Battison; Ade & Company Inc.; Ryan W Dupuis

(57) ABSTRACT

A cooking grill includes a container defining a combustion area and a cooking surface over the combustion area. The grill features a pellet burner unit disposed within the container under the cooking surface and a pellet feeding device arranged to feed pellets into the burner unit. The burner unit comprises a trough into which the pellets are fed. The trough is mounted in a movable support which can be pulled out from within the container. The feeding device includes a removable cartridge for containing pellets and a receptacle for receiving the cartridge inserted thereon so that the cartridge supplies pellets for transfer to the pellet burner unit. In addition, a gas burner system is arranged in the container adjacent to the pellet burner unit so as to apply heat from the gas burner system to the cooking surface in addition to or as an alternative to the pellet burner unit.

20 Claims, 18 Drawing Sheets

Related U.S. Application Data which is a continuation of application No. 14/637,494, filed on Mar. 4, 2015, now Pat. No. 9,814,354.

(51) Int. Cl.

| | |
|---|---|
| *F23B 40/08* | (2006.01) |
| *F23B 60/02* | (2006.01) |
| *F23B 20/00* | (2006.01) |
| *F23C 1/04* | (2006.01) |

(52) U.S. Cl.
CPC ...... *F24C 1/04* (2013.01); *F23B 2900/00001* (2013.01); *F23N 2237/02* (2020.01); *F23N 2237/08* (2020.01)

(56) References Cited

U.S. PATENT DOCUMENTS

| | | | | |
|---|---|---|---|---|
| 7,159,509 | B2* | 1/2007 | Starkey | A47J 37/0704 99/339 |
| 2010/0218754 | A1* | 9/2010 | Kuntz | A47J 37/0786 126/25 R |
| 2013/0298894 | A1* | 11/2013 | Kleinsasser | A47J 37/0704 126/25 R |
| 2014/0311356 | A1* | 10/2014 | Daniels | A47J 37/0713 99/340 |

\* cited by examiner

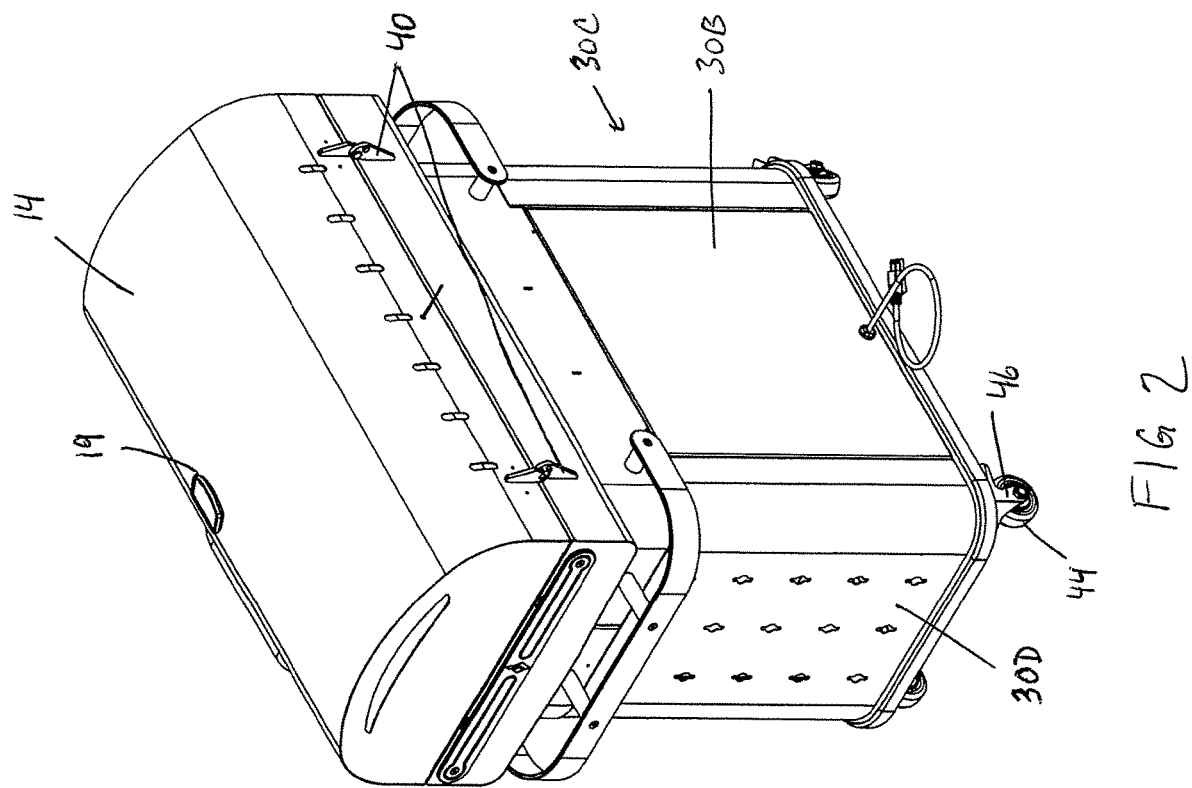
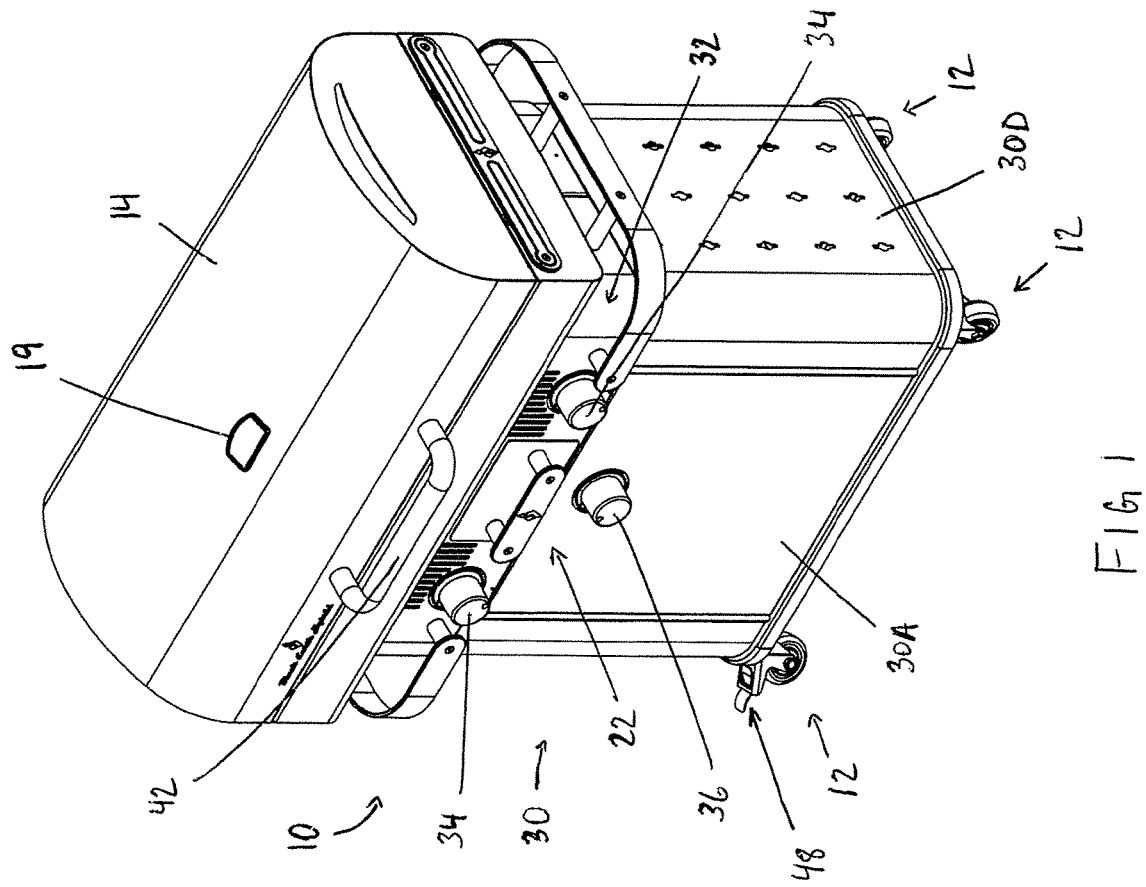

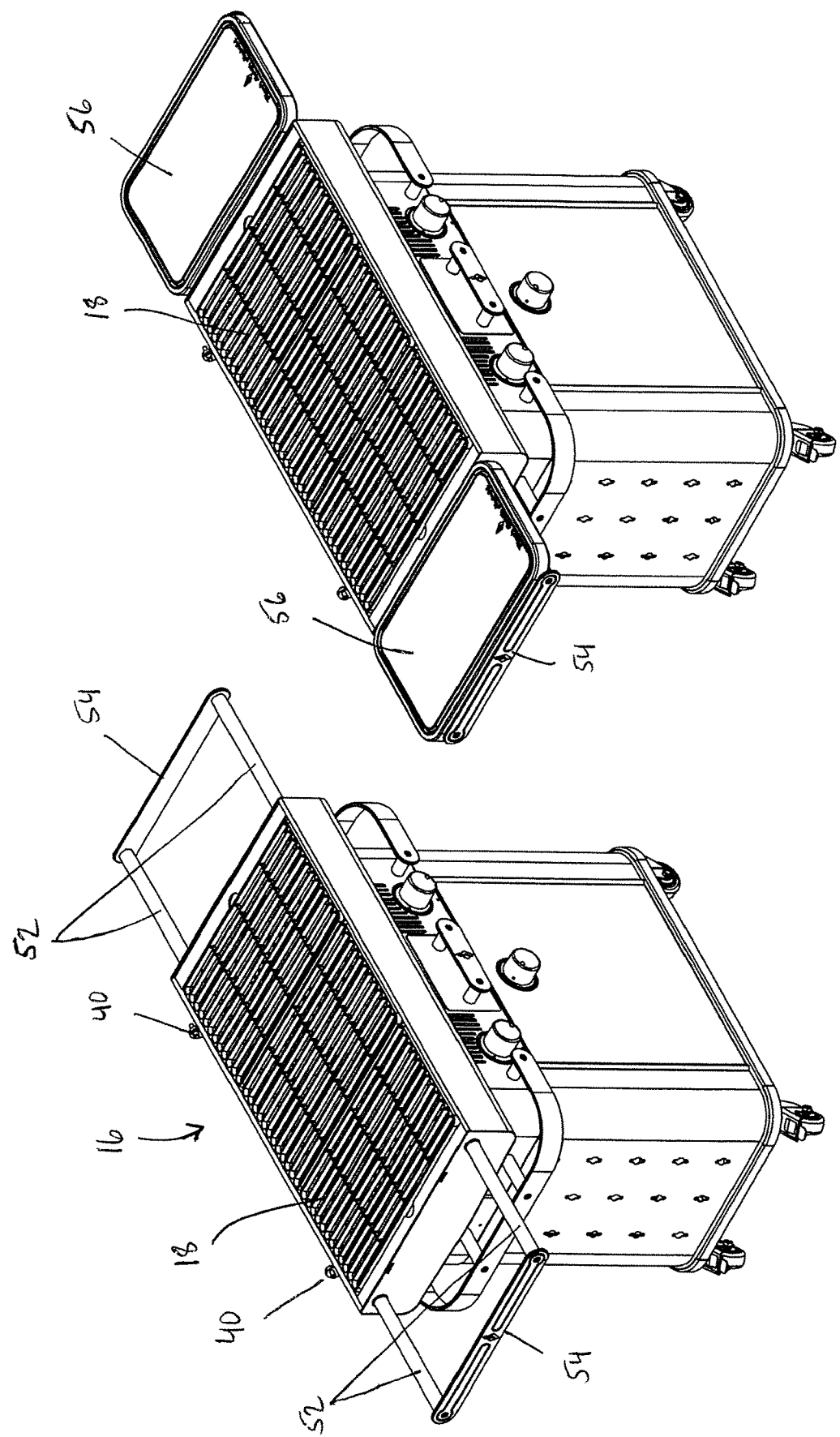

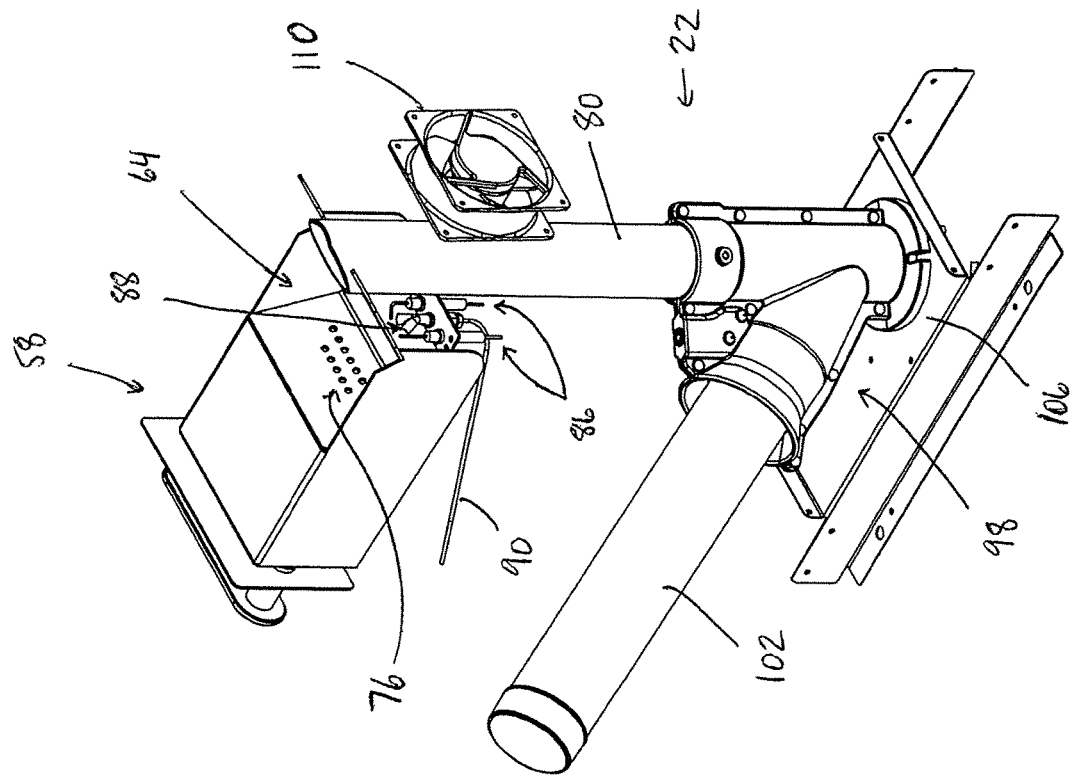
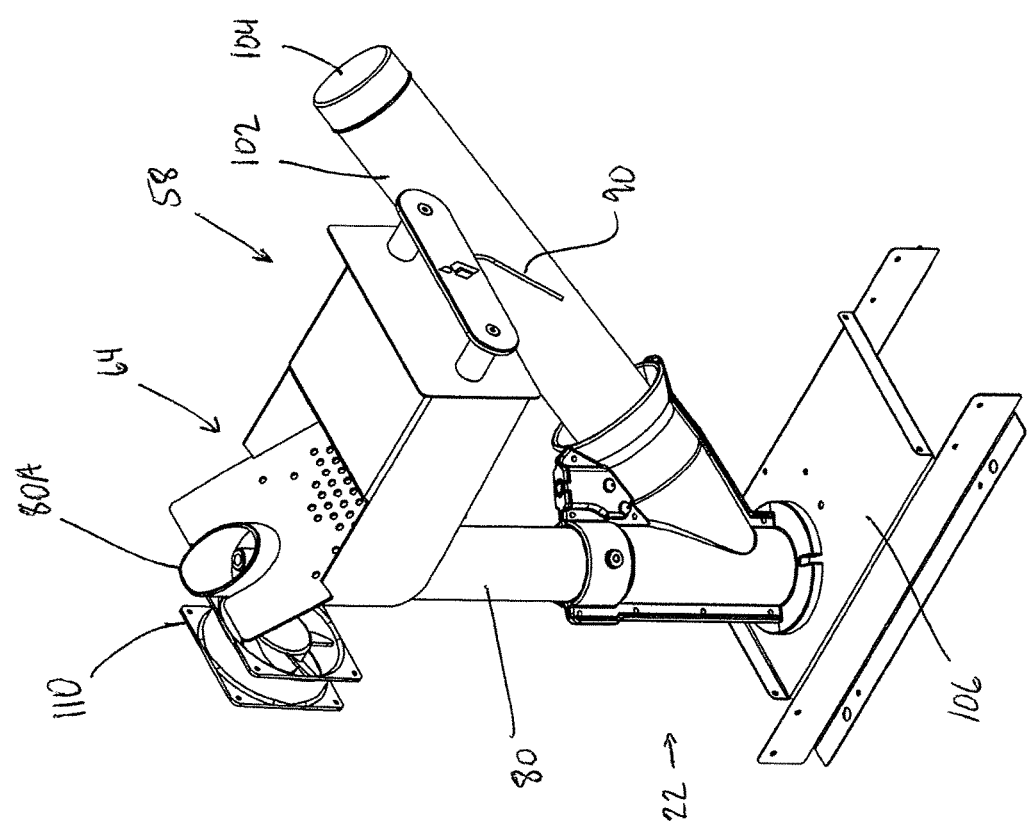

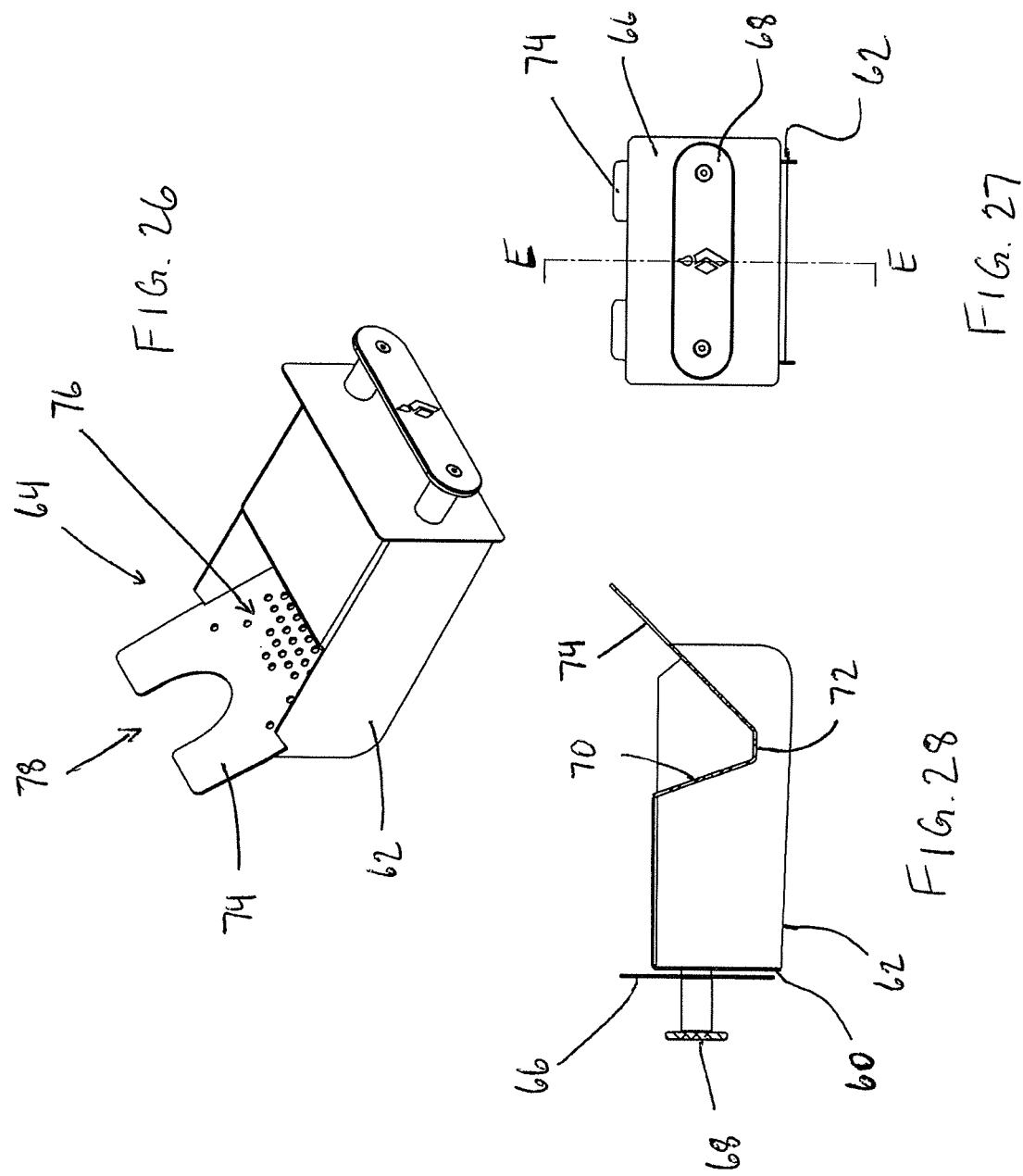

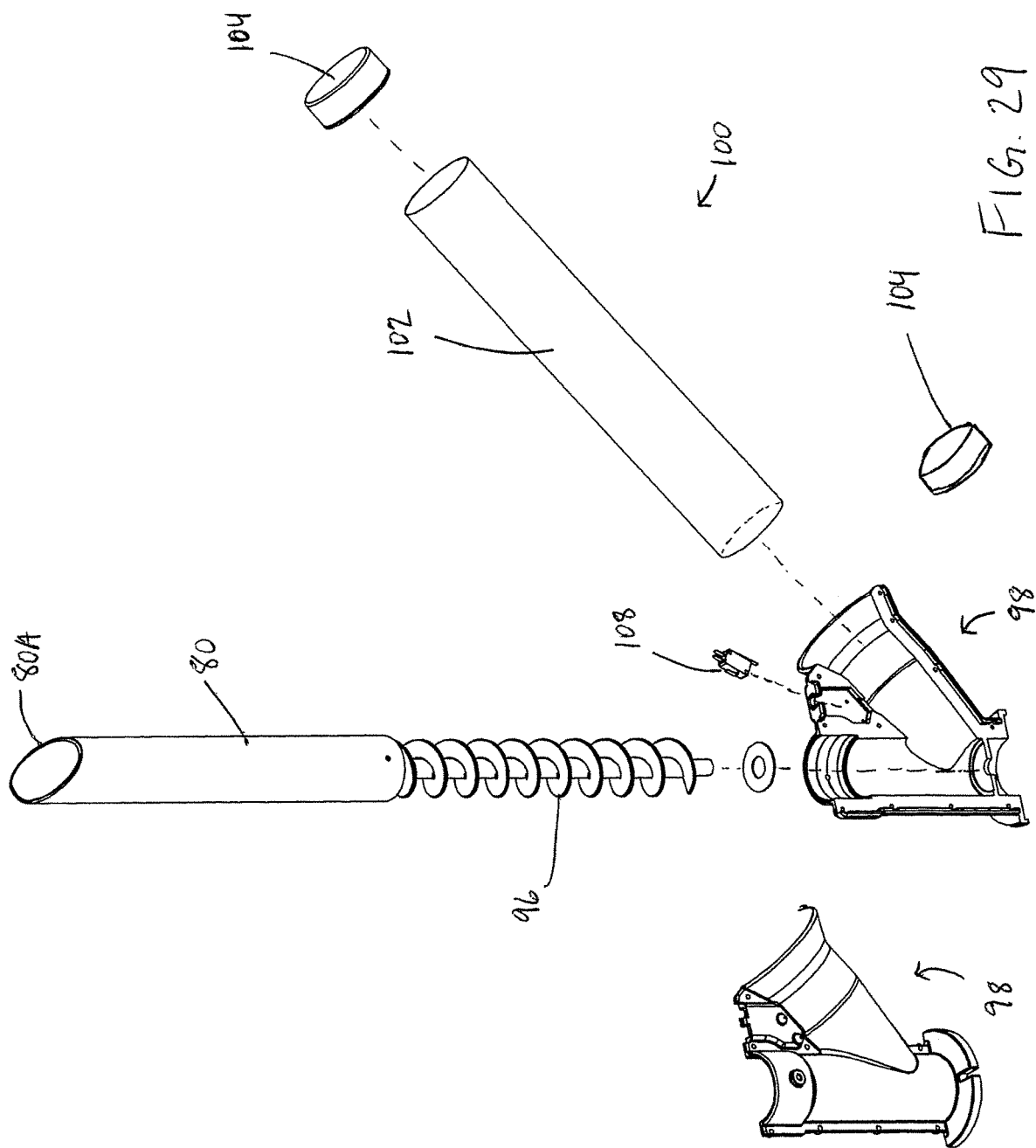

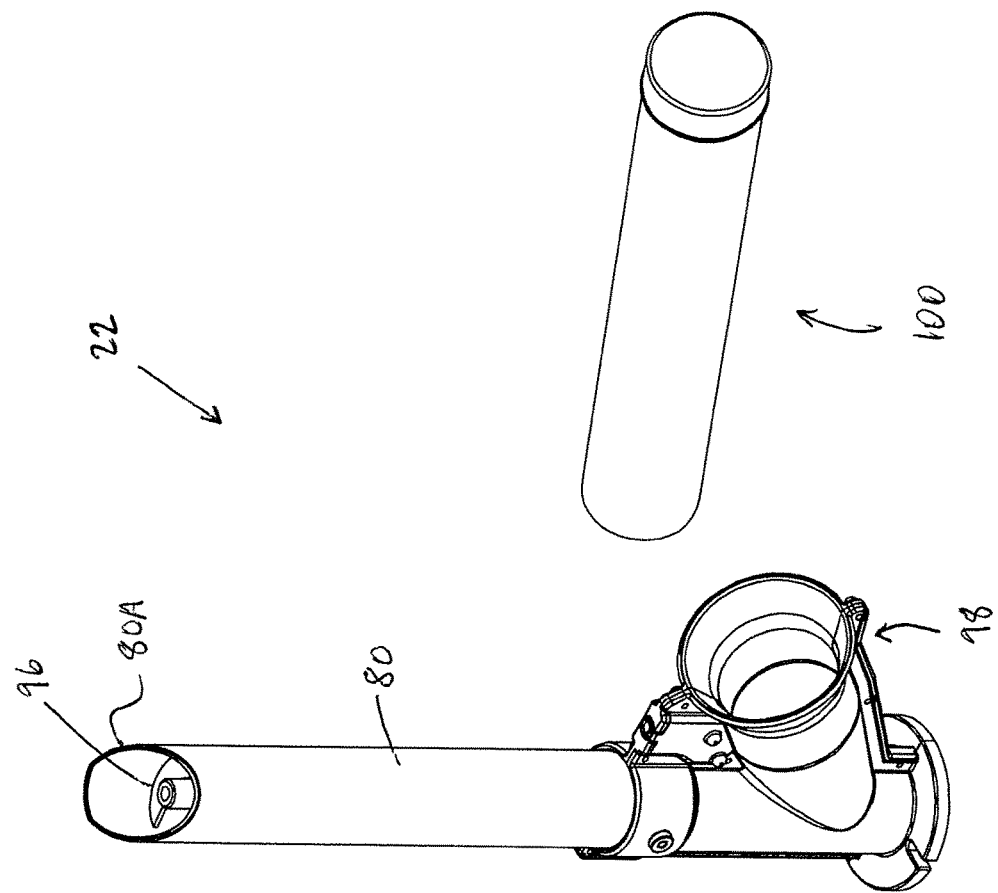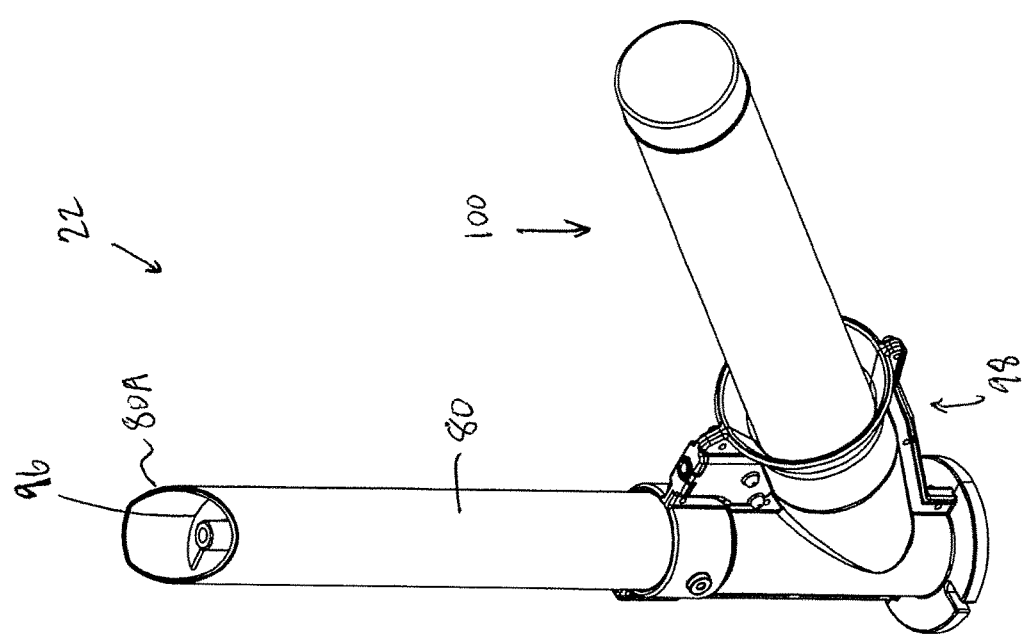

COOKING GRILL USING PELLET FUEL

This application is continuation in part application of application Ser. No. 15/677,793 filed Aug. 15 2017 which is a continuation application of application Ser. No. 14/637,494 filed Mar. 4 2015.

This invention relates to a cooking grill for outdoor grilling and barbecuing of the type which uses compressed fuel pellets of wood for combustion. The arrangement herein can be used particularly in a grill of a hybrid type where extra heat can be provided by a gas source.

BACKGROUND OF THE INVENTION

Recent developments in barbecuing have led to manufacture of a cooking grill of the type comprising a container mounted on legs and having an openable top lid for enclosing a cooking area. A source of heat is provided within the cooking area for applying heat to food products to be cooked carried on a grate within the cooking area. The source of heat includes a heating bowl or container with a pellet feed system for discharging pellets of fuel into the bowl at a predetermined rate for combustion within the bowl to generate heat. An automatic igniter is provided for starting the combustion so that the pellet burner is as convenient as gas but provides much improved food quality. The grate is arranged over the heating bowl at the first end of the container and over the part of the container beyond the heating bowl. One example is sold under the trade name Louisiana-Grills.

SUMMARY OF THE INVENTION

According to the invention there is provided a cooking grill comprising:
  a container defining a combustion area;
  a cooking surface over the combustion area for receiving and supporting food materials to be grilled;
  a pellet burner unit disposed within the container under the cooking surface;
  a pellet feeding device arranged to feed pellets into the pellet burner unit;
  a fan for generating an airflow which at least in part passes through the pellet burner unit for causing combustion of the pellets in the pellet burner unit;
  an igniter for the pellets;
  and a heat control system for controlling the igniter and the pellet feeding device;
  the heat control system being arranged for repeatedly shutting the igniter off to provide cold smoking from the pellets as part of an automatic cold smoking programmed cooking method.

In one arrangement, the heat control system operates to shut off the igniter after a duration of time has elapsed to provide said cold smoking.

In another arrangement there is provided a temperature sensing component arranged to detect temperature in the container and wherein the heat control system operates to shut off the igniter at a programmed temperatures to provide said cold smoking.

Preferably the temperature sensing component is arranged to detect temperature in the container and wherein the heat control system is arranged for controlling a rate of feed of the pellets in dependence on a detected temperature.

In one embodiment the igniter is an electric heating cartridge.

In another embodiment the igniter for the pellets comprises a gas pilot light from a gas burner system.

The arrangement herein can optionally be used in a hybrid cooking grill comprising:
  a container defining a combustion area;
  a cooking surface over the combustion area for receiving and supporting food materials to be grilled;
  a pellet burner unit disposed within the container under the cooking surface;
  a pellet feeding device arranged to feed pellets into the burner unit;
  a fan for generating an airflow which at least in part passes through the burner unit for causing combustion of the pellets in the burner unit;
  a temperature sensing component arranged to detect temperature in the container;
  a heat control system for controlling a rate of feed of the pellets in dependence on a detected temperature;
  and a gas burner system arranged in the container adjacent to the pellet burner unit so as to apply heat from the gas burner system to the cooking surface in addition to or as an alternative to the pellet burner unit.

The embodiment as described in more detail hereinafter provides a hybrid type cooking grill utilizing two alternative fuel sources: compressed pellet fuel or combustible gas. Because the pellet burner unit and feeding device are independent of the gas burner system, either one of the pellet burner unit and gas burner system may be used as the only source of heat or alternatively both can be used in parallel. Furthermore, the grill remains generally operable for cooking if only one of the fuels is available or if electricity is unavailable (since the pellet feeding device is electric powered, in which case the gas burner system is used instead). While a gas pilot light connected to the gas burner system is disposed to provide accelerated ignition compared to known conventional methods of igniting compressed pellet fuels, ability to remove the pellet burner unit from the container permits a person skilled in the art of cooking and grilling to utilize an alternative means of igniting the pellet fuel. As such, incorporating pellet-based cooking and gas-based cooking into a single unit provides "all in one" cooking options with one cooking grill. Availability of pellet and gas fuels affords different flavours and cooking methods to be used in combination with one another. For example, a user of the cooking grill has the option of alternating smoking (using the pellets) and gas grilling for producing different tastes of food products cooked on the cooking surface. Also, the heat control system may be programmed with intelligent cooking programs such that cooking food on the grill may become more time efficient and more precise. In addition, provision of the gas burner system with the pellet burner unit may generally afford quicker grill sanitation compared to a grill fuelled by pellets only by igniting the gas burner system for burning off bacteria, followed by turning off the gas burner system and using only the pellet burner.

The gas burner can use any suitable supply of combustible gas including either propane or natural gas in direct supply or in bottle supply. Typically the container includes a bottom opening for a bottle supply.

Preferably the gas burner system includes a gas burner nozzle on at least one side of and separate from the pellet burner unit. In some cases the gas burner system includes a first and a second gas burner nozzle on respective sides of the pellet burner unit so that the pellet burner is in the center of a three section combustion system.

Preferably the gas burner nozzle is arranged to the side only so that the gas burner system when both are operating does not supply heat directly into the pellet burner unit. That is, they are arranged side by side with the intention of generating and supplying heat independently to the cooking surface so that the pellet burner system operates by controlling the fuel and air supply to generate a required temperature without supplemental heat from the gas into the burner trough.

Preferably the heat control system controls both the gas burner system and the pellet burner unit to maintain a required temperature in the container. That is, the control system can be complex including inputs indicative of a required heat profile over time, indicative of a required smoke content over time together with sensors providing actual real time values so that the control to the fuel supply and the gas supply can maintain the required profiles. For example, the control unit can manage the cooking process in a way which acts to increase heat from the gas burner system while reducing heat from the pellet burner unit so as to increase a level of smoke while retaining a required temperature.

Instead of using the conventional hot rod igniter, the pellet burner unit preferably includes a gas igniter for the pellets receiving a gas pilot light from the gas burner system. This pilot light is separate from the gas burners which apply heat and merely acts to cause ignition following which the pilot light is turned off.

Preferably the pellet burner unit is separated from the gas burner system on one side or both sides of the pellet burner unit by an upstanding wall in the container. This wall can be of a sufficing height to retain the pellets but lower than the cooking support so that the fan and the container are arranged to direct air throughout the container and over the dividing wall so as to spread heat around the container regardless of whether the heat is supplied by one or both of the gas burner system and the pellet burner unit.

Preferably the gas burner system is arranged to apply a gas flame directly to the cooking surface with no intervening briquettes over the gas burner system.

In this arrangement according to one important aspect of the invention, the pellet burner unit preferably comprises a trough into which the pellets are fed, the trough being mounted in a movable support which can be pulled out from the container for removal. While such pellets during continued combustion typically generate little residue, when the system is being cooled at the end of the cooking cycle, residue can generate and the movable support allows access for cleaning of any residue, blockages, or grease in the scenario of a grease fire as well as for attending to any breakdowns without necessarily removing the cooking surface. Also, if the gas burner system is inoperable, the trough may be removed from the container so that the pellet fuel contained therein may be ignited outside the container. Furthermore, different trough designs may be introduced as separate units for replacement into a slot where the trough is disposed in the container. The different trough designs may achieve different combustion ratios for varying the cooking methods that can be implemented on the grill, including the type of smoking and ability to perform cold smoking.

Preferably the movable support slides out through a front wall of the container but other directions can be used.

Preferably the trough is of a form which has opposed inclined walls with an intervening base. However other shapes can be used. The inclined walls tapering toward the base is a suitable shape as it carries the materials to the base and keeps them confined for combustion. Preferably the inclined walls are perforated for passage of air from the fan through the combustion material between the walls and sitting on the base. Preferably the front and rear inclined transverse walls are spaced away from a front wall of the container so as to locate the combustion at a position generally centrally of the cooking surface.

Preferably the fan is fixed in the container so that the trough moves with the support away from the fan which remains in place. Also preferably the pellet feeding device is fixed in the container so that the trough moves with the support away from the pellet feeding device. Thus the support can be a simple tray with no connections which can be pulled out forwardly from the position under the cooking surface.

Preferably the pellet feeding device comprises an upstanding feed tube having a pellet transfer device, typically an auger, in the tube for feeding the pellets upwardly along the tube from below the trough. In order to feed the material into the trough preferably the inclined trough wall includes a cut out shaped to partly surround the feed tube. The top edge of the feed tube can be inclined at a similar angle to the inclined wall to allow the material to more easily spill over onto the base of the trough. Orienting the feed tube substantially upright allows the cooking grill to be more compact and allows pellet fuel to be conveyed upwardly from a bottom of the feed tube so as to keep the fuel supply separated and spaced away from flames and direct heat. Furthermore, a substantially vertical orientation of the feed tube may reduce possibility of backfire due to chimney effect as typically observed in horizontally oriented feed systems in pellet grills.

For easy filling of the system, the pellet feeding device preferably includes a removable tubular cartridge for containing pellets and a receptacle for receiving a neck of the cartridge inserted thereon so that the cartridge supplies pellets for transfer to the pellet burner unit. Preferably the receptacle for receiving the neck of the removable cartridge is located at a bottom of the feed tube spaced well below the burner unit so that the removable cartridge can be inclined upwardly and outwardly away from the upstanding feed tube for easy insertion and to be presented in the area under the container.

According to a further aspect of the invention which can be used in other types of pellet grills without the hybrid heating system there is provided a cooking grill comprising:

a container defining a combustion area;

a cooking surface over the combustion area for receiving and supporting food materials to be grilled;

a pellet burner unit disposed within the container under the cooking surface;

a pellet feeding device arranged to feed pellets into the burner unit;

a fan for generating an airflow which at least in part passes through the burner unit for causing combustion of the pellets in the burner unit;

wherein the pellet burner unit comprises a trough into which the pellets are fed, the trough being mounted in a movable support which can be pulled out from the container for removal.

This trough can use any or all of the features defined above.

According to a yet further aspect of the invention which can be used in other types of pellet grills without the hybrid heating system there is provided a cooking grill comprising:

a container defining a combustion area;

a cooking surface over the combustion area for receiving and supporting food materials to be grilled;

a pellet burner unit disposed within the container under the cooking surface;

a pellet feeding device arranged to feed pellets into the burner unit;

a fan for generating an airflow which at least in part passes through the burner unit for causing combustion of the pellets in the burner unit;

wherein the pellet feeding device includes a removable cartridge for containing pellets and a receptacle for receiving a neck of the cartridge inserted thereon so that the cartridge supplies pellets for transfer to the pellet burner unit.

This cartridge feed system can use any or all of the features defined above.

According to a further aspect of the invention there is provided a cartridge for use in a pellet grill of the type defined above where the cartridge comprise and elongate body which may be tubular or other shapes with a neck and end closure cap over the neck for insertion into a receptacle of the pellet feeding device. Typically the wall of the cartridge is tubular and includes top and bottom end caps to close the cartridge when removed from the pellet feeding device preferably the wall of the cartridge is transparent to allow viewing of the contents. Using the removable tubular cartridge to supply the pellets for transfer to the pellet burner unit may afford easier and more straightforward refueling as opposed to transferring pellets from a bag which can be awkward and can be easier to spill material. Also, a plurality of different combinations of various types of pellets for can be prepared for sale in removable cartridges, allowing better portioning and sizing of pellets in a container of fixed and known size (although different sized cartridges may be designed for use with the pellet transfer device or the pellet transfer device designed differently to accommodate another size of cartridge). Such cartridges can be easily stored compared to conventional bags which are typically not sealed, allowing the cartridges to be easily sold over the internet and shipped to customers. Furthermore, the cartridges may create a new market comprising cartridge refilling and "coin" fuel dispensing systems including the pellet transfer device. In addition, the removable cartridge may be removed from the receptacle each time after use of the grill and closed by its caps so that the pellets remaining in the cartridge are enclosed therein for storage in a substantially dry location so as to reduce likelihood of pellets absorbing moisture, disintegrating, and/or clumping together that is typically a result of prolonged outdoor storage and in which case the pellets are no longer suited for use.

BRIEF DESCRIPTION OF THE DRAWINGS

One embodiment of the invention will now be described in conjunction with the accompanying drawings in which:

FIG. 1 is an isometric view of a grill according to the invention.

FIG. 2 is a further isometric view of the grill of FIG. 1 from the rear.

FIG. 7 is an isometric view of the grill of FIG. 1 with the lid removed and both pairs of extendable struts in an extended position.

FIG. 8 is an isometric view of the grill in FIG. 7 with the removable panels supported respectively on each pair of the struts.

FIG. 22 is an isometric view of the grill of FIG. 1 from the front showing only the pellet burner unit, pellet feeding device, and fan.

FIG. 23 is a further isometric view of the grill of FIG. 1 from the rear showing only the pellet burner unit, pellet feeding device, and fan.

FIG. 26 is an isometric view of the grill of FIG. 1 showing only the pellet burner unit.

FIG. 27 is a front elevation view of the grill of FIG. 1 showing only the pellet burner unit.

FIG. 28 is a cross-sectional view of the grill as shown in FIG. 27 and taken along line E-E.

FIG. 29 is an exploded view of the grill of FIG. 1 showing the feed system to the pellet burner unit only.

FIG. 32 is an isometric view of the grill of FIG. 1 showing only the pellet feed system with the removable cartridge inserted in the receptacle.

FIG. 33 is a further isometric view of the grill of FIG. 1 showing only the pellet feed system with the removable cartridge removed from the receptacle.

In the drawings like characters of reference indicate corresponding parts in the different figures.

DETAILED DESCRIPTION

Figure 4:
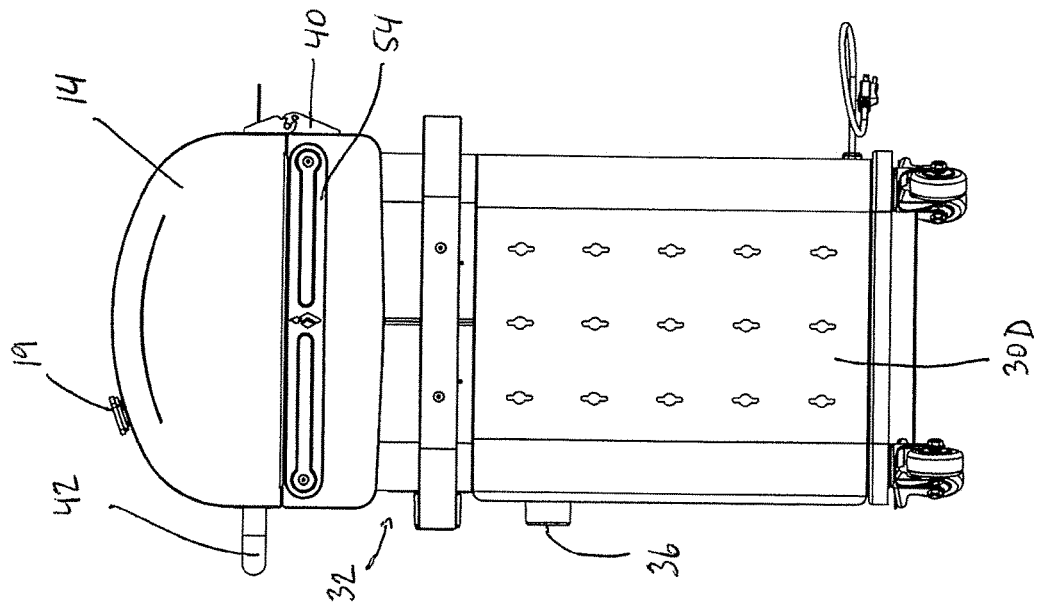
FIG. 4 is a side elevation view of the grill of FIG. 1 from the right.
Figure 3:
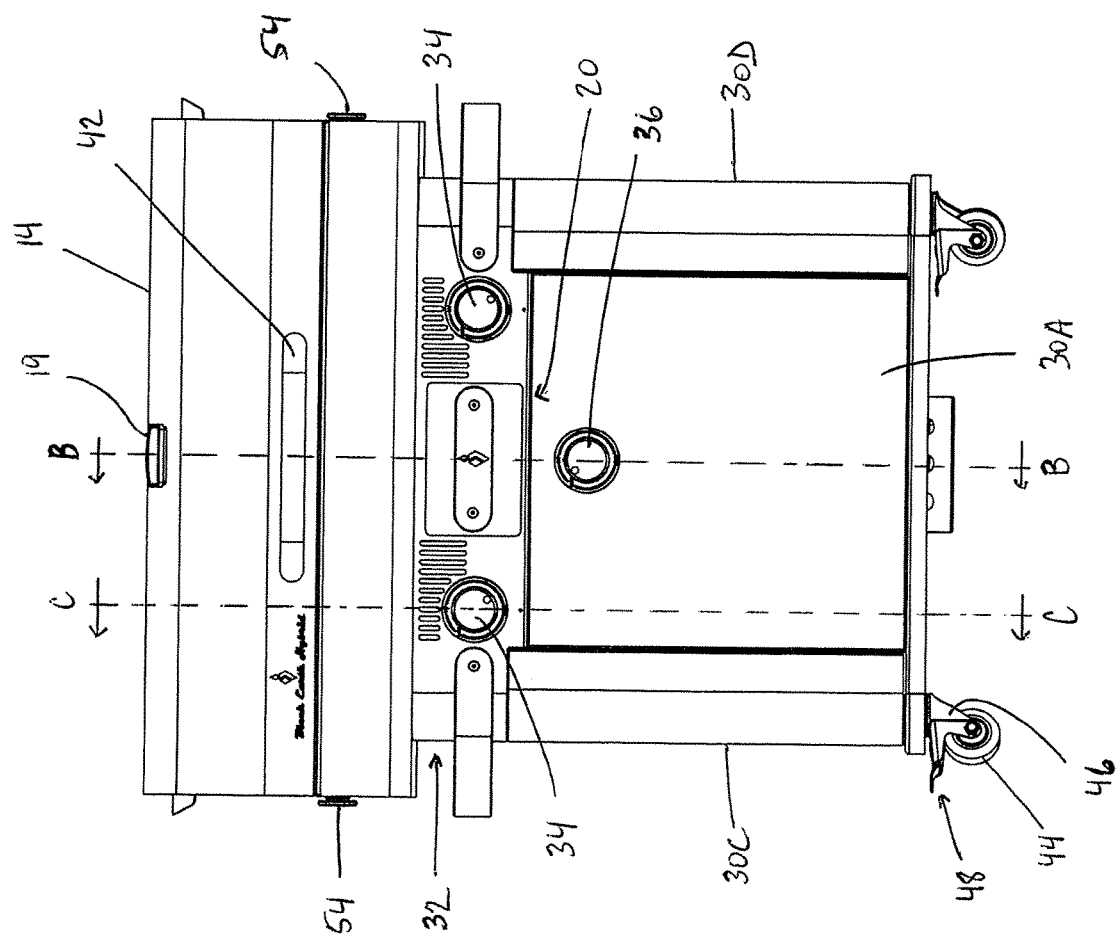
FIG. 3 is a front elevation view of the grill of FIG. 1.
Figure 6:
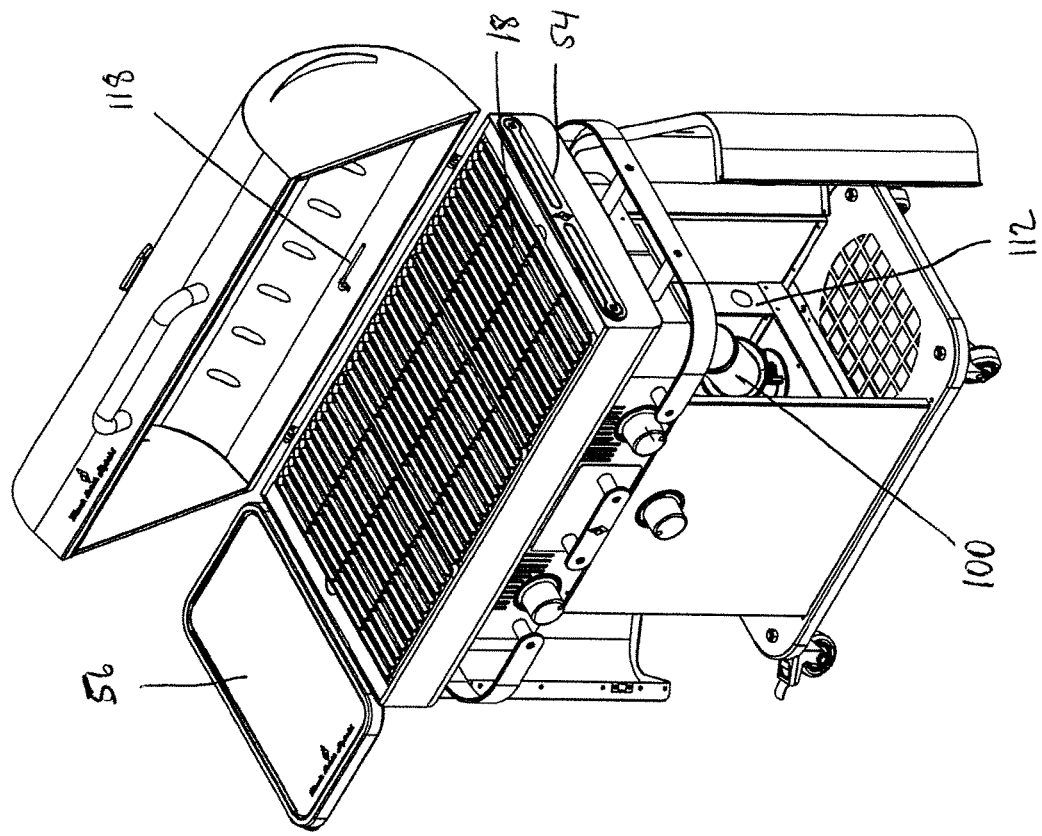
FIG. 6 is a further isometric view of the grill in FIG. 5 from the right.
Figure 5:
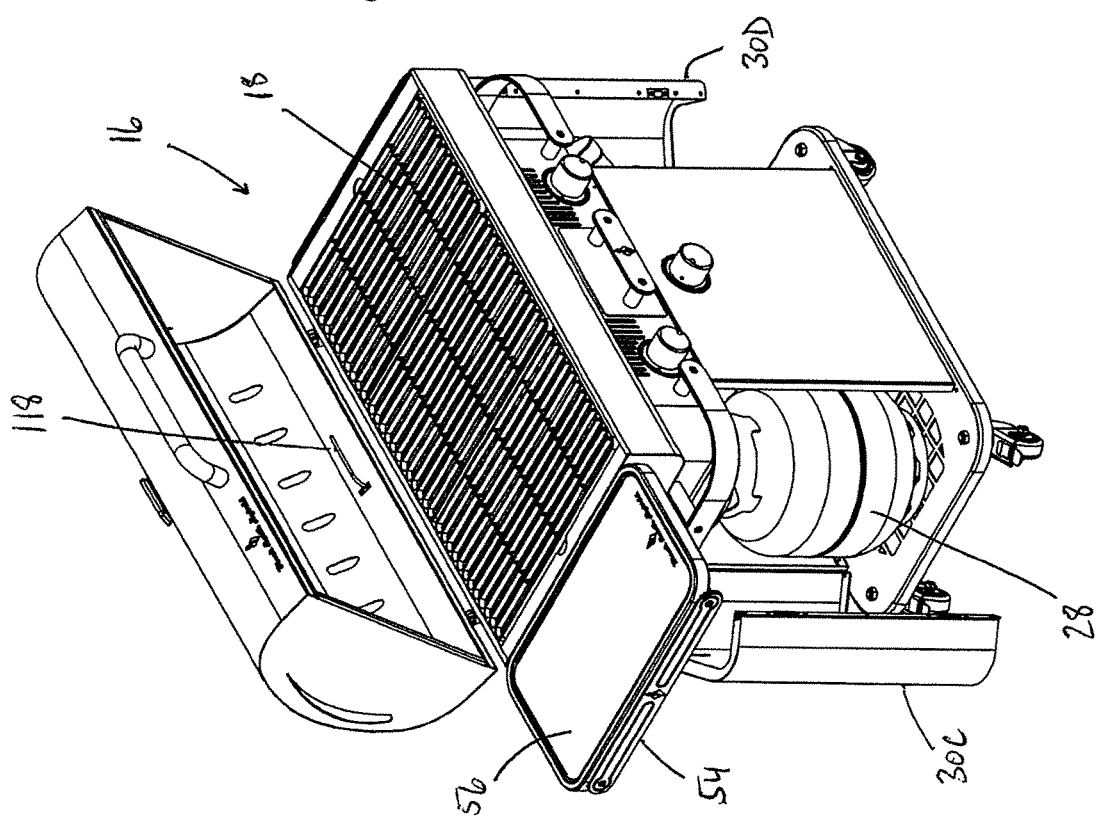
FIG. 5 is an isometric view of the grill of FIG. 1 from the left with the lid opened showing the cooking surface and end walls opened showing a tank for the gas supply and one pair of extendable struts extended and supporting a removable panel thereon.
Figure 10:
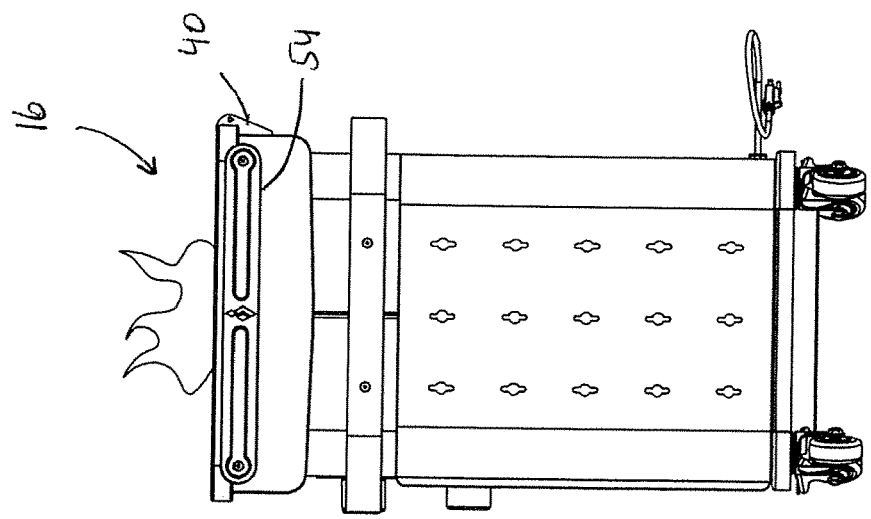
FIG. 10 is a side elevation view of the grill in FIG. 8 depicting the open flame.
Figure 9:
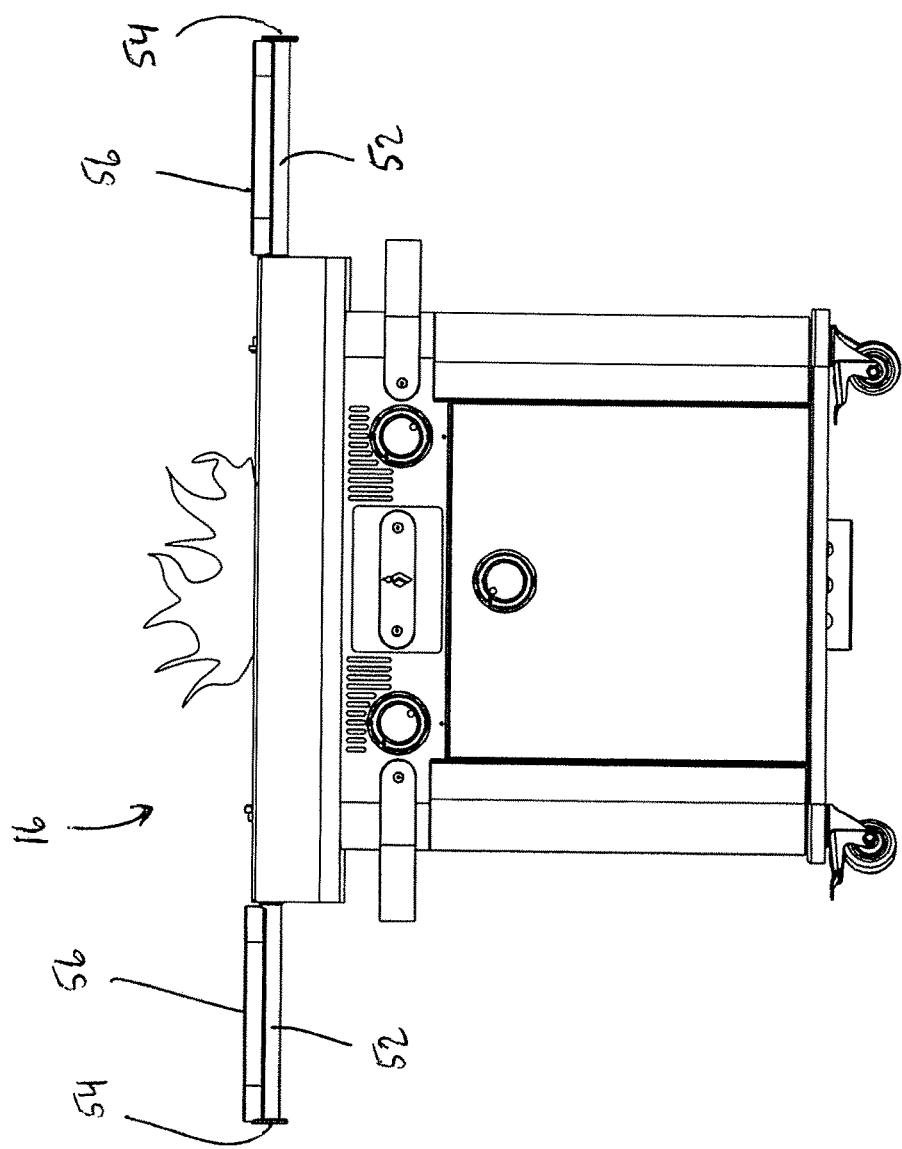
FIG. 9 is a front elevation view of the grill in FIG. 8 depicting an open flame accessible from any transverse direction around the grill.
Figure 12:
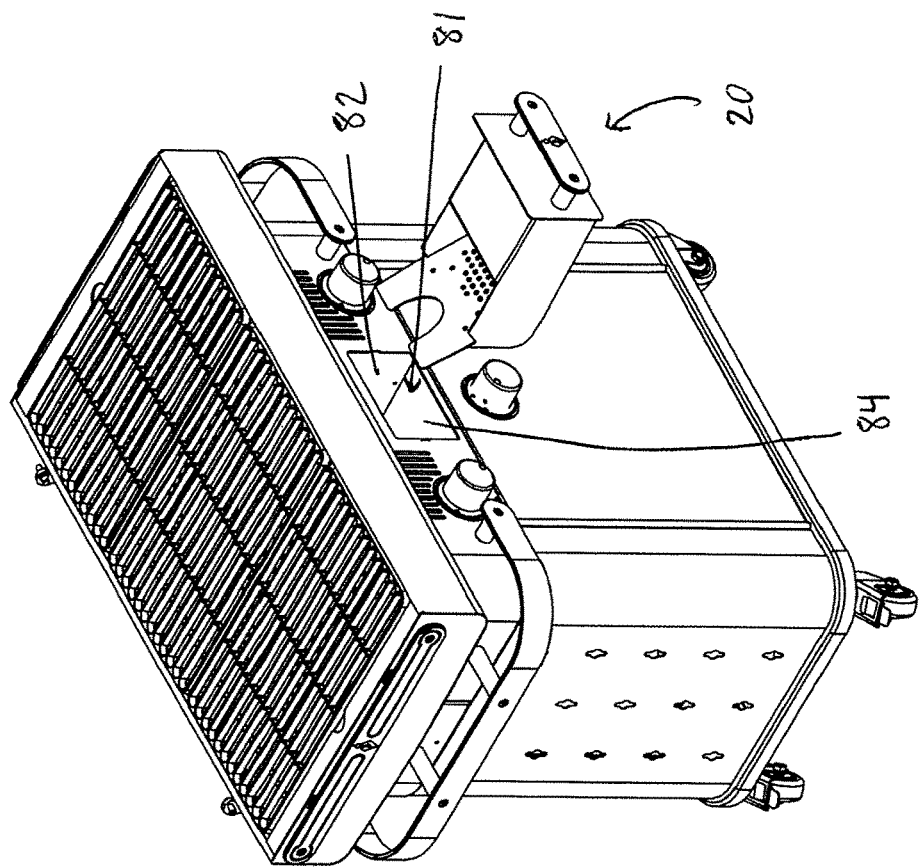
FIG. 12 is an isometric view of the grill in FIG. 11 with the pellet burner unit removed from within the container.
Figure 11:
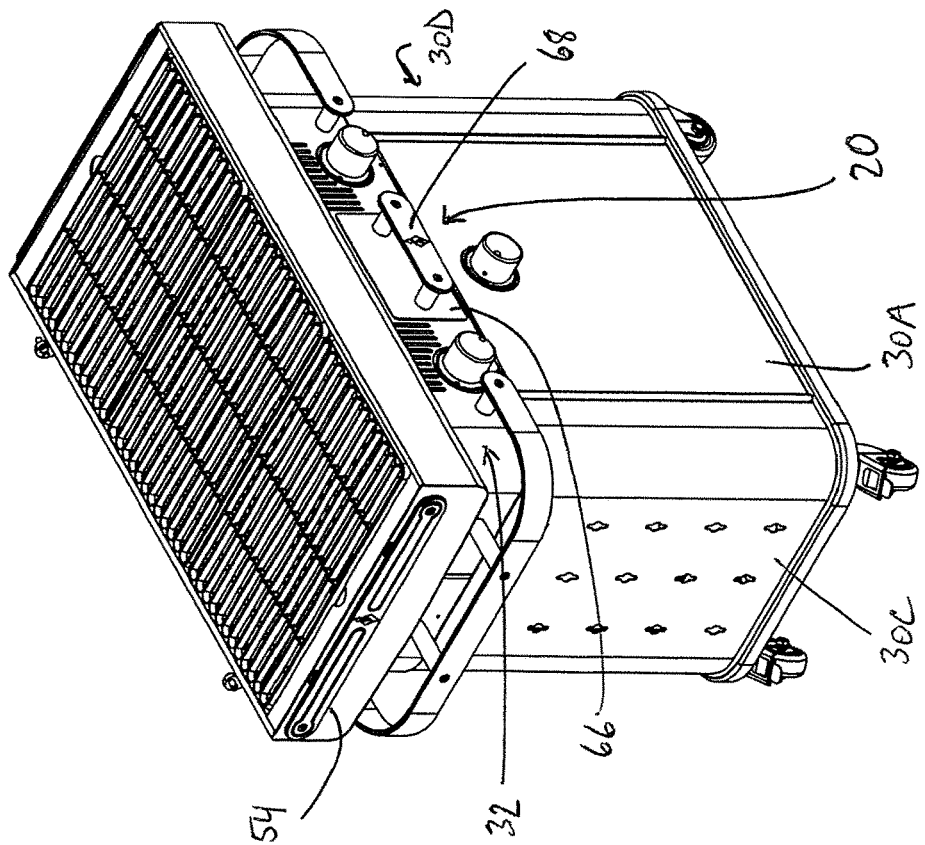
FIG. 11 is an isometric view of the grill of FIG. 1 with the lid removed and emphasis on the pellet burner unit received in the container.
Figure 14:
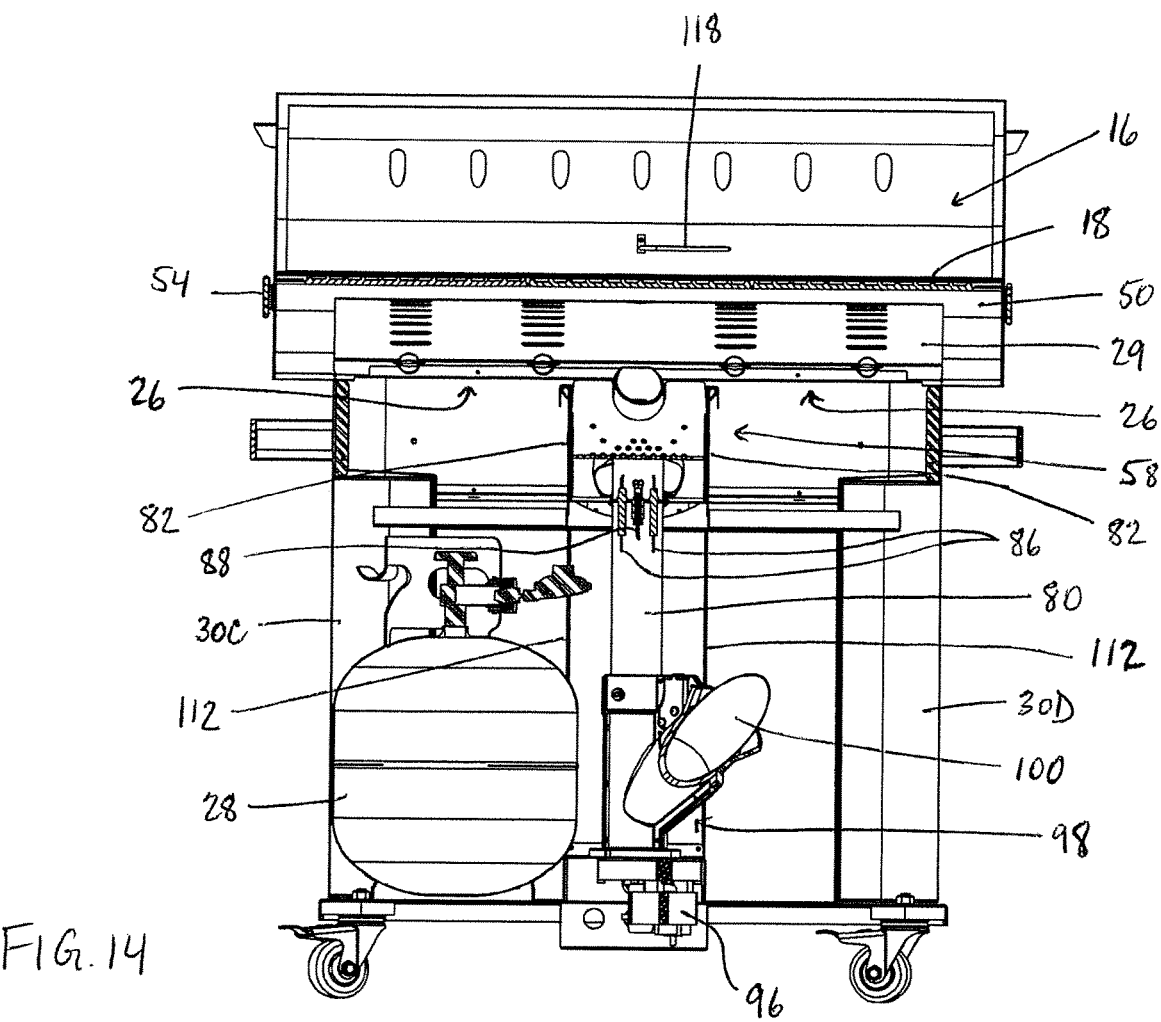
FIG. 14 is a cross-sectional view of the grill of FIG. 1 taken along line A-A in FIG. 13.
Figure 13:
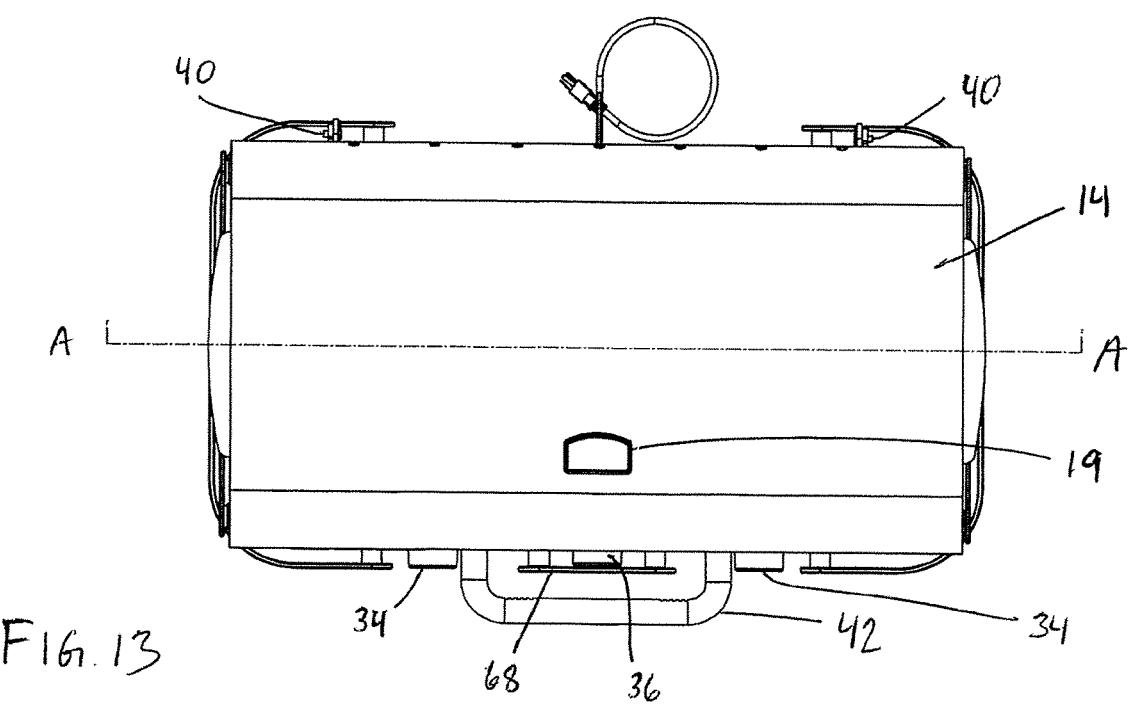
FIG. 13 is a top plan view of the grill of FIG. 1.
Figure 16:
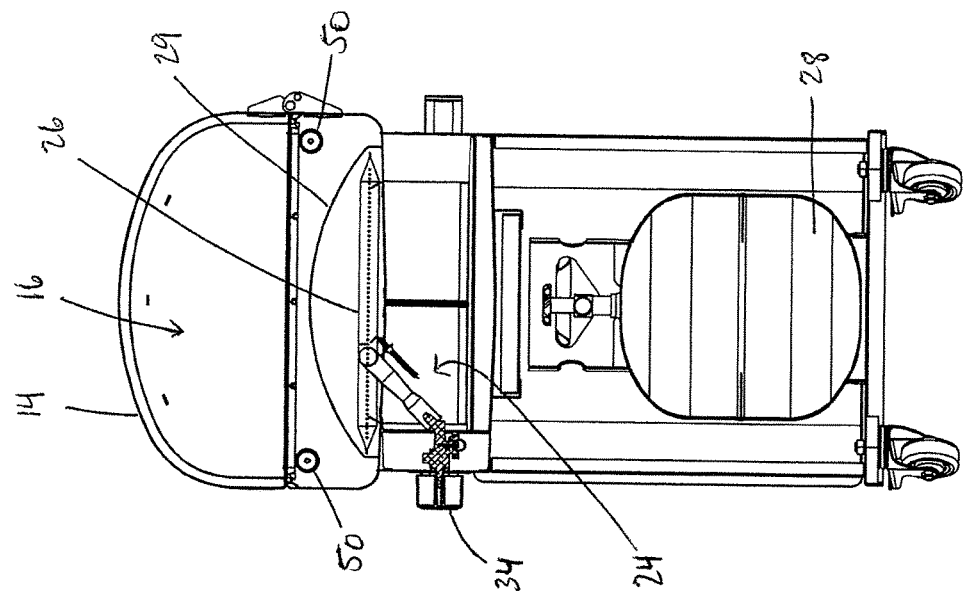
FIG. 16 is a cross-sectional view of the grill of FIG. 1 taken along line C-C in FIG. 3.
Figure 15:
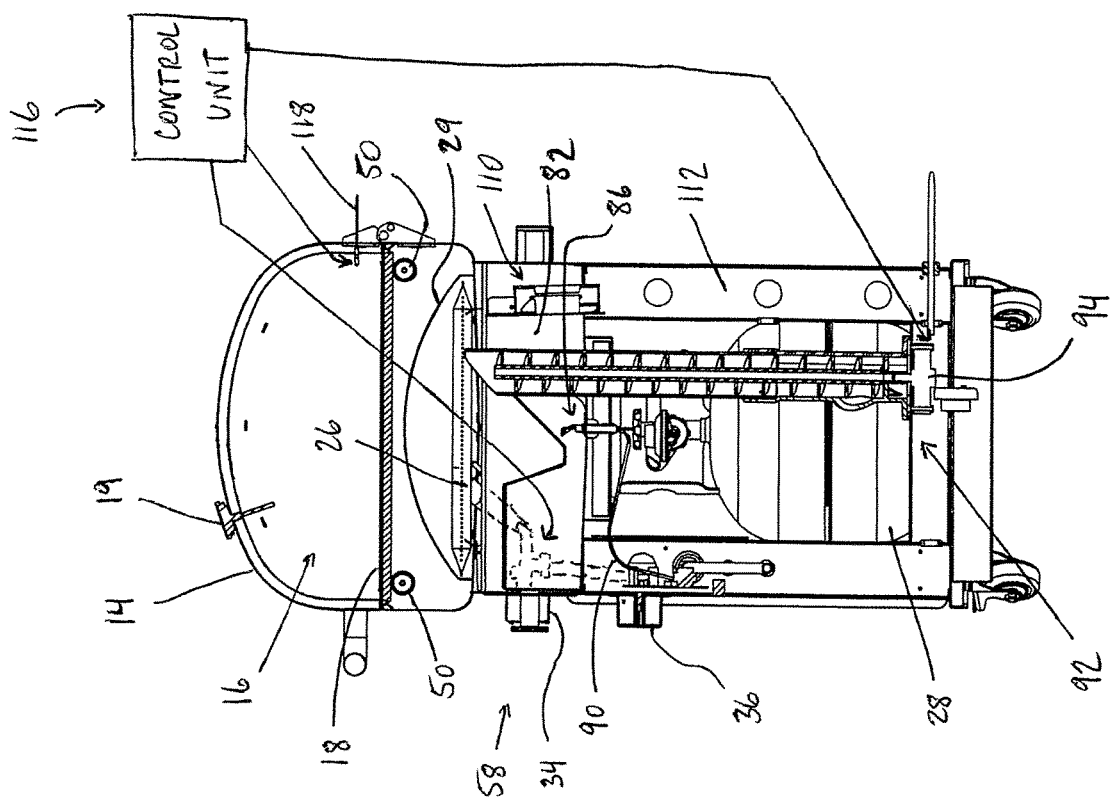
FIG. 15 is a cross-sectional view of the grill of FIG. 1 taken along line B-B in FIG. 3 with the heat control system illustrated schematically.
Figure 18:
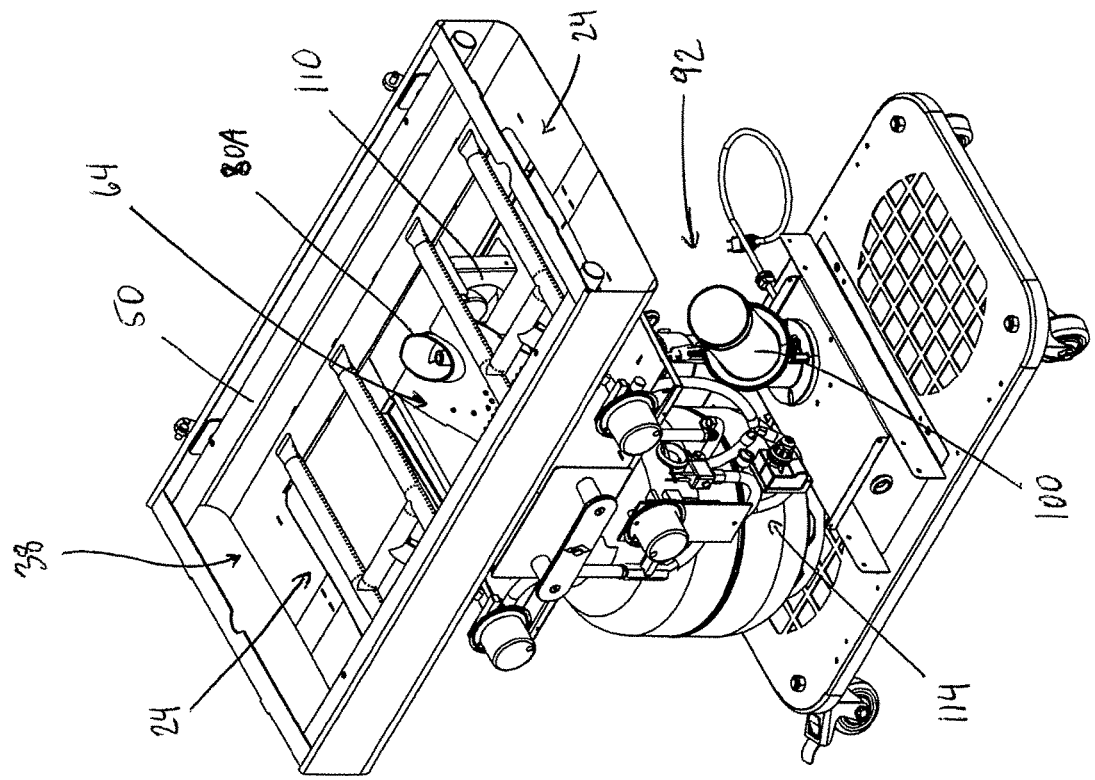
FIG. 18 is a further isometric view of the grill of FIG. 1 from the right with the container and cooking surface removed as in FIG. 17 and some interior components cutaway to show other components like the trough and fan.
Figure 17:
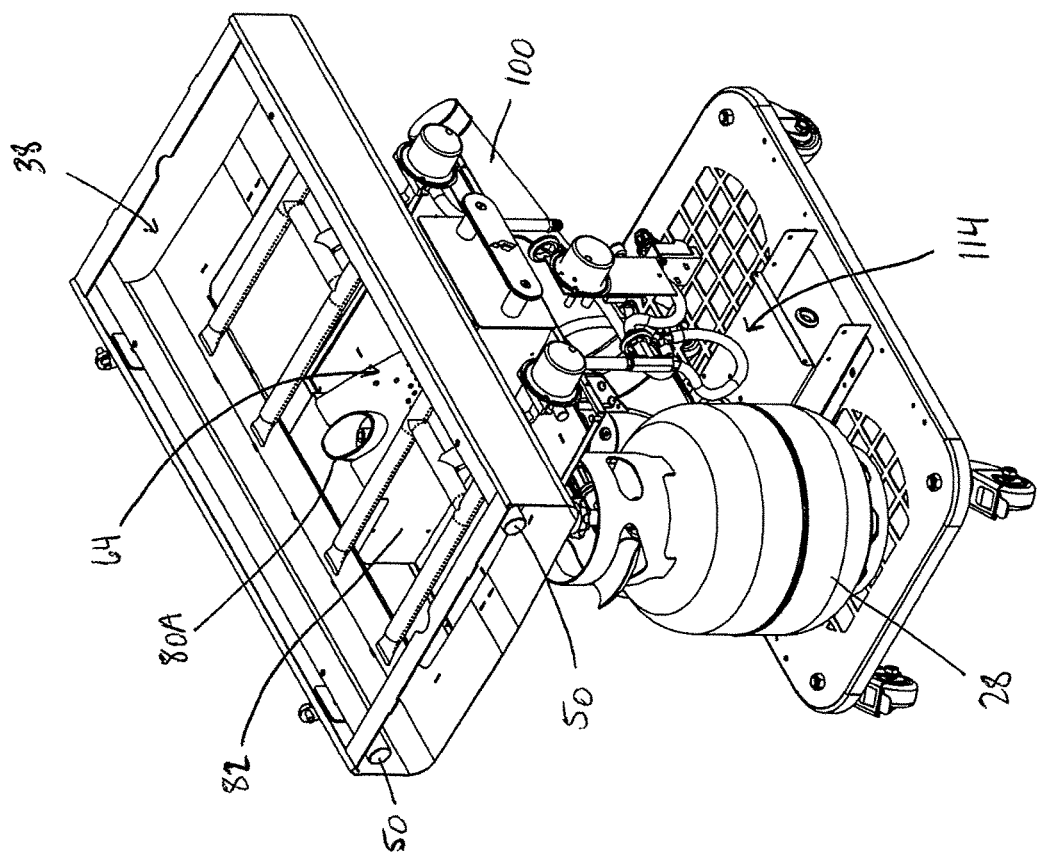
FIG. 17 is an isometric view of the grill of FIG. 1 from the left with the container and cooking surface removed to show the interior components.
Figure 20:
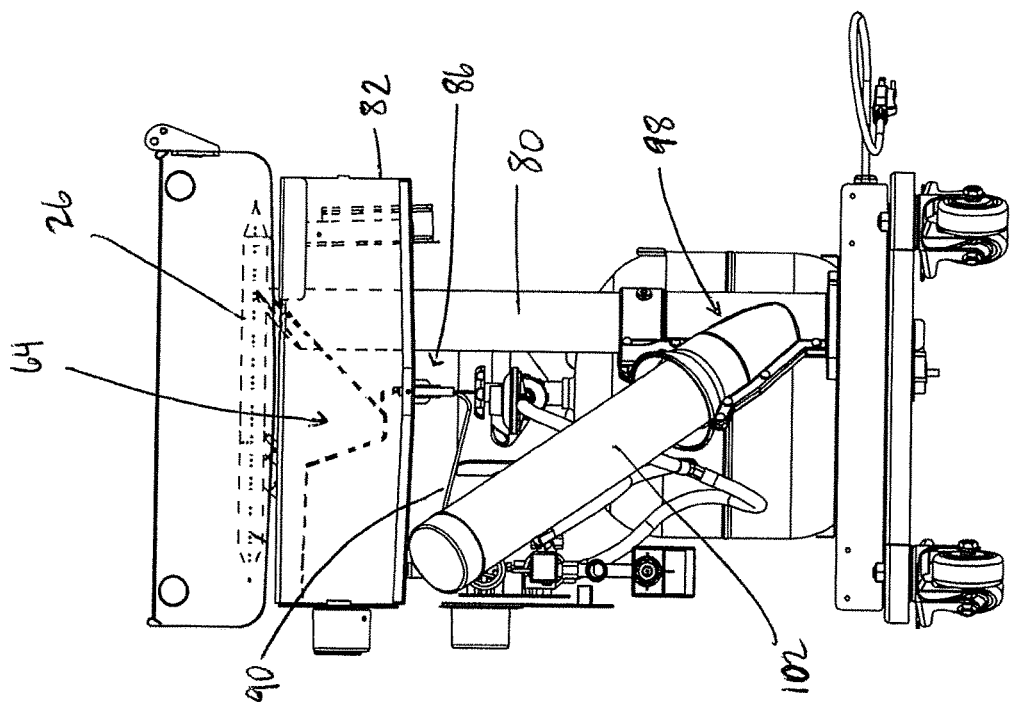
FIG. 20 is a side elevation view of the grill of FIG. 1 from the right with the container and right side gas burner nozzle removed as in FIG. 19.
Figure 19:
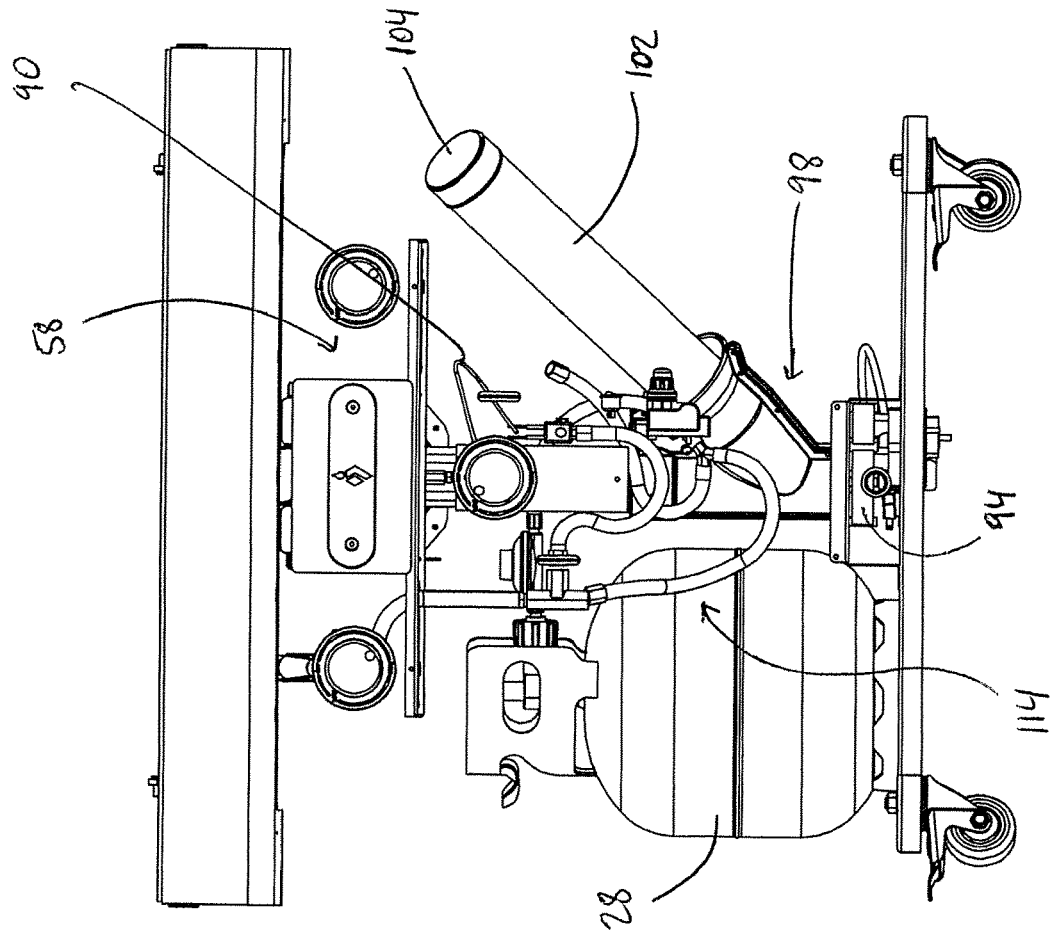
FIG. 19 is a front elevation view of the grill of FIG. 1 with the container and right side gas burner nozzle removed.
Figure 21:
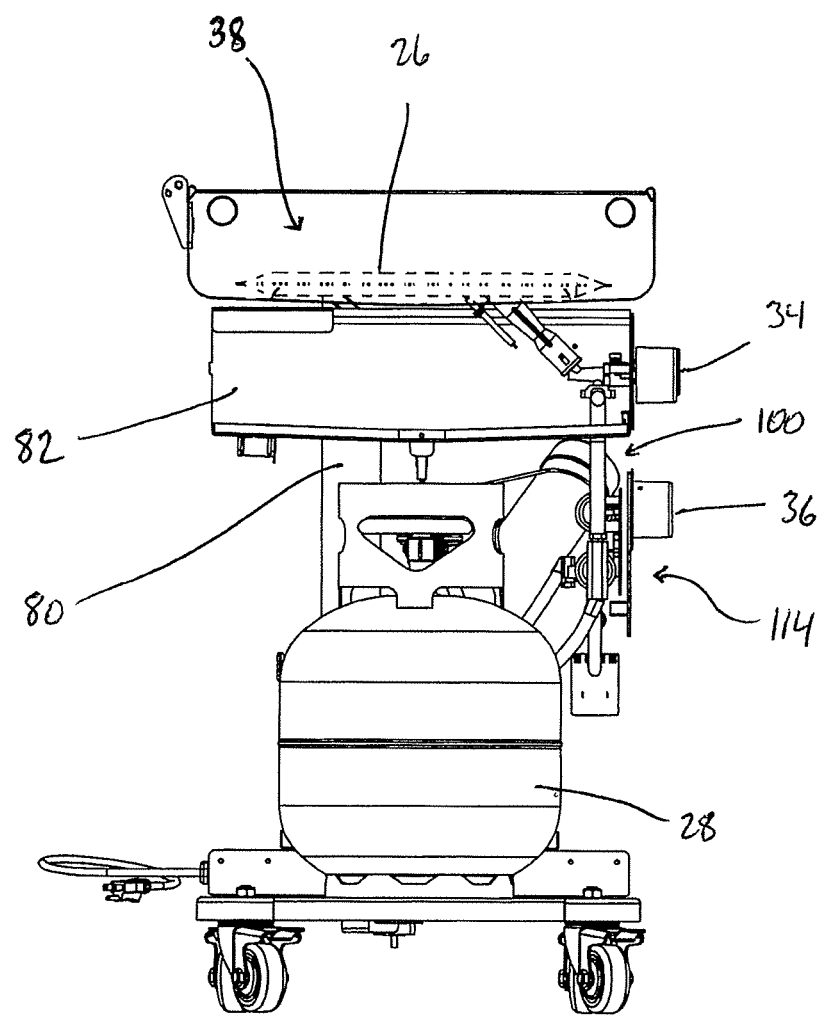
FIG. 21 is a further side elevation view of the grill of FIG. 1 from the left with the container and right side gas burner nozzle removed as in FIG. 19.
Figure 24:
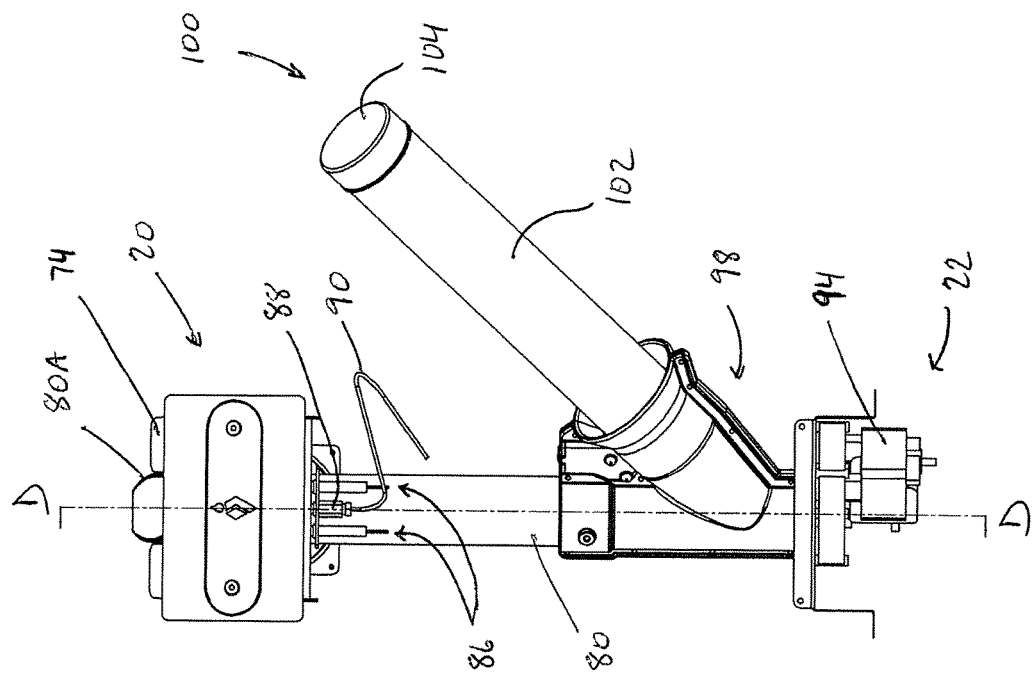
FIG. 24 is a front elevation view of the grill of FIG. 1 showing only the pellet burner unit, pellet feeding device, and fan.

The cooking grill shown in the drawings includes a container 10 mounted on legs 12 and having an openable top lid 14 for enclosing an interior cooking area 16. A source of heat is provided within the cooking area for applying heat to food products to be cooked carried on a grate 18 within the cooking area. Also, a thermometer 19 is located in an upper portion of the lid 14 and is arranged to measure temperature in the cooking area 16 and display the temperature measured as a reference for a user while cooking. The source of heat comprises a pellet burner unit 20 suited for containing and combusting compressed pellet fuel therein to generate heat. The pellet burner unit is disposed generally centrally within the container near a top thereof beneath the cooking grate 18. A pellet feeding device 22 also disposed in the container is arranged to discharge pellets into the pellet burner unit at a predetermined rate. The source of heat also comprises a gas burner system 24 which is adjacent the pellet burner unit within the container and also beneath the grate. The gas burner system includes two gas burner nozzles 26 disposed respectively on either side of the pellet burner unit 20. The burner nozzles are arranged to combust a supply of combustible gas, such as propane or natural gas, stored within a tank 28 so as to generate and apply heat to the cooking grate in addition to or as an alternative to the pellet burner unit. A fire grate covering 29 is disposed over the burner nozzles between the nozzles and the cooking grate as in a conventional grill for protecting the burner nozzles and pellet burner unit against grease dripping downwardly from food products received and supported on the cooking grate and onto the nozzles and burner unit. The fire grate covering is convex in shape in an upwardly direction towards the cooking grate along a full longitudinal length of the fire grate covering.

Turning now to the container 10 in more detail, the container has a peripheral wall 30 comprising front 30A and rear 30B covers and two opposing end walls 30C and 30D which close the peripheral wall at its two longitudinally opposing ends. Each end wall has a plurality of openings therein located for permitting airflow through the container and for dissipating heat generated by the source of heat in the container. The end walls are carried on respective internal hinges adjacent the rear cover 30B of the container so as to be openable for accessing an inside of the container. The front cover and front portions of the end walls collectively partially define a front wall of the container that also includes a fixed portion above the front cover. The fixed portion of the front wall carries gas control knobs 34 of the gas burner nozzles projecting outwardly from the fixed portion of the front wall that are coupled to valves operatively connected between the nozzles and the tank. The gas control knobs are arranged to control the supply of gas to each burner for varying the amount of heat generated by the gas burner nozzles as in a conventional barbeque. The front cover carries a pellet control knob 36 for the pellet burner unit projecting outwardly from the front cover.

The lid 16 forms a continuation of the cylindrical wall to cover an opening 38 between the front 30A and rear 30B covers and the end walls 30C and 30D. The lid is detachably carried on hinges 40 and is closed by a handle 42 so as to provide an attractive continuation of the cylindrical wall. The lid may be removed as shown in FIGS. 7-10 so as to convert the cooking grill into a "camp fire" unit having an open flame accessible from 360 degrees around the grate.

Each leg 12 of the grill is located at an internal corner of the cylindrical wall and coupled at a bottom of the container. Each leg comprises a wheel assembly having a wheel 44 supported for rotational movement on a mounting bracket 46. The mounting bracket is pivotal about an upright axis at the respective internal corner of the cylindrical wall so that the container is movable by rolling movement across a surface. The wheel assemblies have brakes 48 for resisting the rolling movement of the container such that the container remains stationary when the grill is in use.

The cooking grate 18 is horizontally oriented across the opening 38 of the container such that the grate is bridging the container at a height above the heat source and bridging a top edge of the opening 38 at the front and carried on a support ledge at the rear. As such, the cooking grate forms a conventional horizontal flat perforated grate for the food products. The top edge of the opening at the front and the support ledge at the rear are defined respectively by a tubular member 50 which is longitudinally oriented within the container. The two tubular members slidably receive a pair of struts 52 respectively in each collective longitudinal end of the tubular members. Each pair of struts is bridged at free ends of the struts by a decorative bridging element 54. Each pair of struts is slidably extendable from a retracted position in which a majority of the struts is received within the tubular members and the decorative bridging elements are substantially flush with outside ends of the cooking area 16 to an extended position in which the majority of the struts is extending outwardly beyond the container. A panel 56 defining a planar surface for supporting food products prior to or after cooking or cooking utensils thereon is arranged to be detachably supported on each pair of struts as more clearly illustrated in FIGS. 7-8.

Turning now to the pellet burner unit and components of the grill related thereto, the pellet burner unit comprises a metal heating bowl or pan 58 carried inside of the container 10. The metal heating pan comprises a front pan wall 60, opposing side pan walls 62, and a trough 64 spaced rearwardly from the front pan wall such that the trough is disposed generally towards the rear of the pan 58. The trough locates the combustion of the pellets generally centrally of the cooking surface defined by the grate 18. The pan also comprises a front panel 66 parallel to and spaced outwardly from the front pan wall and a pan handle 68 which projects outwardly from the front panel of the pan.

The trough 64 of the pan has a front trough wall 70 oriented at a decline relative to the front pan wall. That is, the front trough wall extends rearwardly and downwardly from a top of the front trough wall to a bottom thereof. A bottom trough wall 72 defining a base of the trough extends horizontally rearwardly from the bottom of the front trough wall 70. At the rear of the bottom trough wall, a rear trough wall 74 extends upwardly and rearwardly from the bottom trough wall at a bottom of the rear trough wall meeting the rear of the bottom trough wall to a top of the rear trough wall. The rear trough wall extends further upwardly than the front trough wall such that the top of the rear trough wall is above the top of the front trough wall. A plurality of openings 76 are located in both the front and rear trough walls for permitting airflow through the heating pan to effect combustion of the pellets contained between the front and rear trough walls sitting on the bottom trough wall 72.

Furthermore, the rear trough wall has a cut out 78 towards the top thereof which is substantially semi-circular in shape. The cut out is shaped to partly surround an upstanding feed tube 80 of the pellet feeding device described in more detail later.

The front pan wall and side pan walls of the metal heating pan at least in part define a movable support to which the trough is mounted. As such, the heating pan is slidably movable through the fixed portion 32 of the front wall of the container. In the illustrated embodiment, the heating pan is removed from within the container in a forwardly direction. When the heating pan is received entirely in the container in a pan receptacle 81 comprising side dividing walls 82 and a bottom support wall 84, the front panel 66 of the heating pan is substantially flush with the front wall of the container. The heating pan may be entirely removed from within the container for cleaning residue often generated when the grill is being cooled at the end of the cooking cycle or such that the heating pan of the illustrated embodiment may be alternated with another type of heating pan having a different combustion ratio (primarily a result of the design of the trough, in particular the number of openings in the trough walls amongst other design features).

Turning to the pan receptacle 81, the pan receptacle 81 is sized and shaped to slidably receive the metal heating pan 58 therein. The bottom support wall 84 spans between the side dividing walls 82 for supporting the heating pan thereon when the pan is received in the pan receptacle. Furthermore, the side dividing walls 82 define upstanding walls disposed in the container on respective sides of the metal heating pan separating the gas burner system from the pellet burner unit. The side dividing walls are oriented upright and parallel to one another and extend laterally from the front wall of the container to the rear wall thereof. The side dividing walls extend above the side pan walls 62 to retain the pellets in the trough 64 but terminate at upper ends of the side shielding walls below the cooking grate 18 so that air can be directed throughout the container and over the side dividing walls so as to spread the heat around the container regardless of whether the heat is supplied by one or both of the gas burner and the pellet burner unit.

A gas igniter 86 is disposed within the container rearwardly adjacent the rear trough wall 74 of the heating pan. The gas igniter comprises a pair of igniters longitudinally spaced apart and carrying an electric current providing a spark for igniting a gas pilot light 88 received between the pair of igniters. The pilot light is operatively coupled to the gas burner system by a respective fuel line 90 so as to be supplied by the tank 28 also supplying the gas burner nozzles. The gas igniter provides a flame for ignition of the pellets in the trough that is separate of the flame produced by the gas burner nozzles 26 such that the pellet burner unit can be operated independently of the gas burner nozzles. As such, once the pellets are ignited the pilot light is turned off.

The pellet feeding device 22 comprises an auger pellet feed system 92 driven by a motor 94. The auger pellet feed system is fixed within the container so that the trough moves with the movable support away from the feed system. The feed system comprises the upstanding feed tube 80 extending from the bottom of the container vertically upwardly to a top 80A of the feed tube adjacent the top of the rear trough wall 74. The top of the feed tube projects through the cut out 78 in the rear trough wall. An auger 96 defining a vertical conveyor is received within the feed tube 80 arranged for rotational motion about a central vertical axis of the feed tube for delivering the pellets upwardly along the feed tube from a receptacle 98 at the bottom thereof to the top 80A of the feed tube that is inclined at a similar angle to the rear trough wall so as to allow the pellets to more easily spill into the base of the trough. The receptacle is arranged to receive a neck of a removable cartridge 100 supplying the pellets. The receptacle is disposed at the bottom of the feed tube such that the cartridge is spaced below the source of heat. The receptacle is arranged such that cartridge is inclined upwardly and outwardly away from the feed tube 80 when the cartridge is received in the receptacle 98.

Turning now to the removable cartridge 100 in more detail, the removable cartridge is tubular and has a transparent peripheral wall 102. The cartridge also comprises top and bottom end caps 104 to close open ends of the transparent peripheral wall when the cartridge is removed from the receptacle 98. The cartridge 100 thus comprises a removable container for containing pellets for transportation and supply of the pellets having a wall with a closed end for containing the pellets. The container has an open mouth at an end opposite the closed end and a tubular neck portion at the open mouth. The end cover over the open mouth and the container form a transportable component separate from the receptacle to allow supply and transportation of the pellets within the container while closed by the end cover. The receptacle comprises a transfer tube having a pellet transfer device in the tube for feeding the pellets along the transfer tube from the receptacle to the pellet burner unit. The receptacle includes an insert sleeve with an upwardly facing open mouth and a lower end of the insert sleeve connecting to the transfer tube. When the tubular neck portion is inserted in the open mouth of the insert sleeve, the insert sleeve engages and holds the tubular neck portion with the wall and closed end of the container supported above the upwardly facing mouth for feeding the pellets through the open mouth into the insert sleeve and into the transfer tube.

Orientation of the cartridge in an inclined fashion allows gravity to transfer the pellets from the cartridge to the receptacle such that the pellets spill into the receptacle from the cartridge as the auger conveys the pellets from the bottom of the feed tube into the trough. As such, the orientation of the cartridge may be utilized by filling the cartridge with pellets of different varieties in an ordered manner. For example, half of the cartridge may be filled with hickory wood pellets and another of the cartridge may be filled with apple wood pellets. In this manner, half of the cartridge from one end cap to the proximate midpoint of the length of the cartridge comprises one type of wood on its own and the other half from the midpoint of the cartridge to the opposing end cap comprises another type of wood on its own. Regardless of which wood type defines a lower portion of the cartridge once the cartridge is inserted into the receptacle such that the type of pellets defining a first wood type in the lower portion passes through the auger pellet feed system first and before a second wood type, the arrangement allows the wood type to be automatically switched from the first type to the second type during the cooking process as the pellets are transferred from the cartridge by gravity.

The motor 94 driving the auger is located below the feed tube 80 beneath a support plate 106 on which the feed tube is supported within the container 10. In the illustrated embodiment, the motor comprises an electric motor requiring an external electric supply. Also, a sensor 108 is located in the receptacle adjacent where the neck of the cartridge is received for detecting presence of the removable cartridge therein. The sensor is operatively connected to the motor so that if the sensor detects absence of the cartridge power will be disconnected from the motor as a safety precaution. In alternative embodiments, the sensor may be able to detect levels of pellet material remaining in the cartridge.

In addition to the pellet burner unit and the pellet feeding device, a fan 110 is fixed between upstanding brackets 112 adjacent the rear wall of the container across from the metal heating pan 58 so that the feed tube 80 is generally intermediate between the fan and the pan in a lateral direction. The fan is operable to generate an airflow in the container which in part passes through the trough 64 through the openings 76 in the trough walls for effecting the combustion of pellets confined in the base 72 of the trough. Furthermore, location of the fan and sufficing height of the side dividing walls 82 allow airflow generated by the fan to be directed throughout the container so as to spread heat around the container regardless of the heat source.

Turning now to the gas burner system 24 in more detail, the gas burner nozzles 26 are operatively connected at supply ends to the gas tank contained within the container by fuel lines 114. The valves to which the gas control knobs are coupled are located along the fuel lines for controlling the supply of gas to the gas burner nozzles. The gas burner nozzles apply heat to the grate 18 in the form of a gas flame and do not supply heat directly to the metal heating bowl 58. In the illustrated embodiment, the nozzles comprise H burners spanning across a majority of the cooking area beneath the grate. The H burners are longitudinally disposed between the pellet burner unit and the end walls of the container. In alternative embodiments, a briquette grate may be disposed above the gas burner nozzles intermediate the nozzles and the cooking grate for supporting intervening briquettes over the nozzles.

The cooking grill further includes a heat control system 116 operatively connected between a temperature sensing probe 118 centrally located at the rear of lid for detecting temperature in the cooking area 16; the gas burner nozzles 26; and the auger pellet feed system 92 so as to be arranged for controlling the gas and pellet burning systems to maintain a required temperature in the cooking area. The control system can be complex including inputs indicative of a required heat profile over time, indicative of a required smoke content over time together with sensors providing actual real time values so that the control to the pellet fuel supply and the gas supply can maintain the required profiles. For example, the heat control system can manage the cooking process in such a way which acts to increase heat from the gas burner nozzles 26, which may be accomplished by increasing supply of gas thereto, while reducing heat from the metal heating pan 58, which may be achieved by reducing the rate of feed of the pellets into the trough, so as to increase a level of smoke while maintaining the required temperature. The heat control system is arranged to control a rate of feed of the pellets in dependence on a detected temperature, which may be achieved by controlling speed of the motor 94. If the amount of heat from the pellet burner unit is to be increased, the heat control system increases the rate of discharge of the pellets into the trough. In alternative embodiments, the heat control system is also operatively connected to the fan 110 so as to vary a volume of air passing through the pellet burner unit for adjusting the combustion rate of the pellets. In other embodiments, the heat control system may be programmed with intelligent cooking programs such that cooking food on the grill may become more time efficient, precise, and automated. An exemplary cooking program may include turning on one of the pellet and gas systems at a first specific temperature as detected by the temperature sensing component and shutting one of the systems off after duration of time has elapsed or at a second particular temperature. The heat control system may also be programmed to provide cold smoking as part of a programmed cooking method such that the grill is operable for "automatic cold smoking".

Operation of the pellet burner unit and the gas burner system is independent of one another such that cooking (in a general sense) using the grill may still be performed even if only one of the pellet and gas systems are operable (for example, because only one type of fuel is available or if electricity is unavailable for powering the pellet feeding device). Generally speaking, the pellet burner system operates by controlling the fuel and air supply to generate a required temperature without supplemental heat from the gas into the trough of the pellet burner unit. As such, the cooking grill of the illustrated embodiment provides "all in one" cooking options in a single grill unit having ability to produce a variety of different tastes in the food products cooked thereon by alternating between smoking (using the pellets) and gas grilling. Cooking using the grill of the illustrated embodiment may also become more efficient as the gas burner system can be used for quickly sanitizing the grill and the heat control system may be programmed to execute cooking programs that can enhance efficiency and precision cooking on the grill and potentially automate certain portions of the cooking cycle or process.

Figure 25:
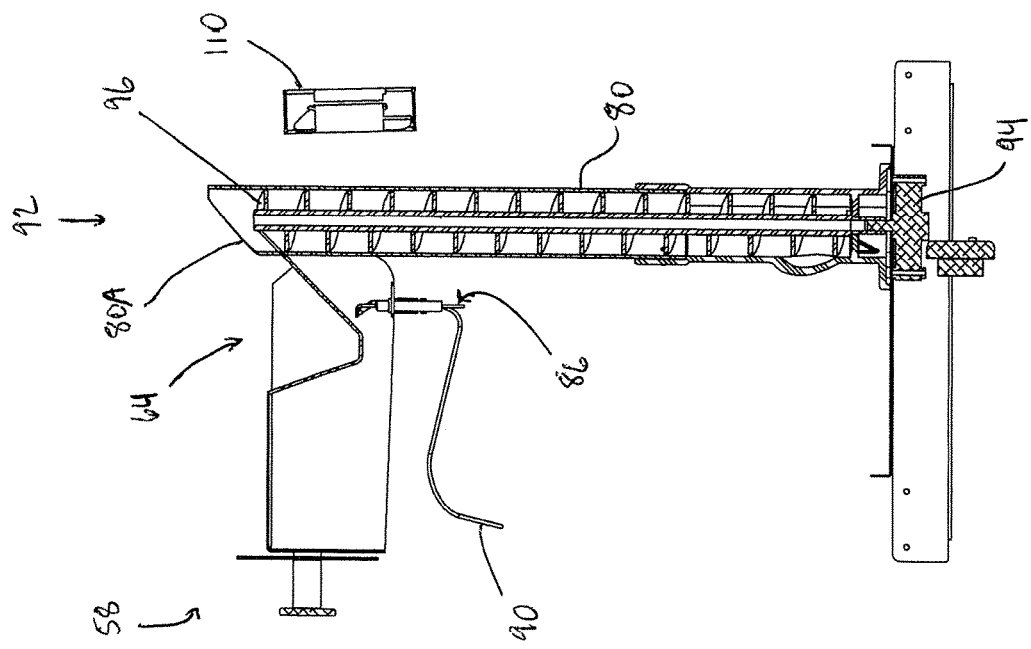
FIG. 25 is a cross-sectional view of the grill as illustrated in FIG. 24 and taken along line D-D.
Figure 30:
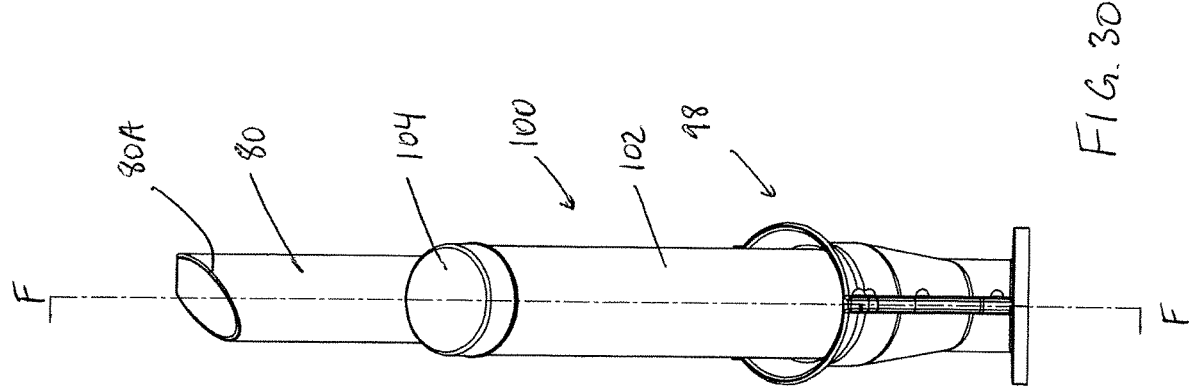
FIG. 30 is an elevation view of the grill of FIG. 1 showing the feed system to the pellet burner unit only.
Figure 31:
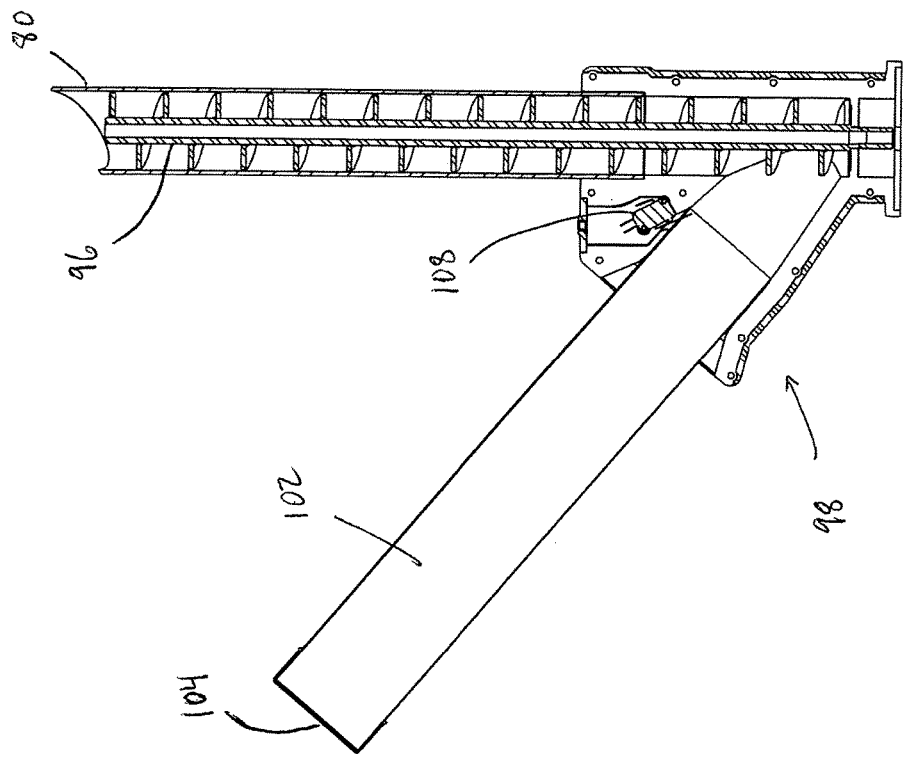
FIG. 31 is a cross-sectional view of the grill as illustrated in FIG. 30 and taken along line F-F.
Figure 34:
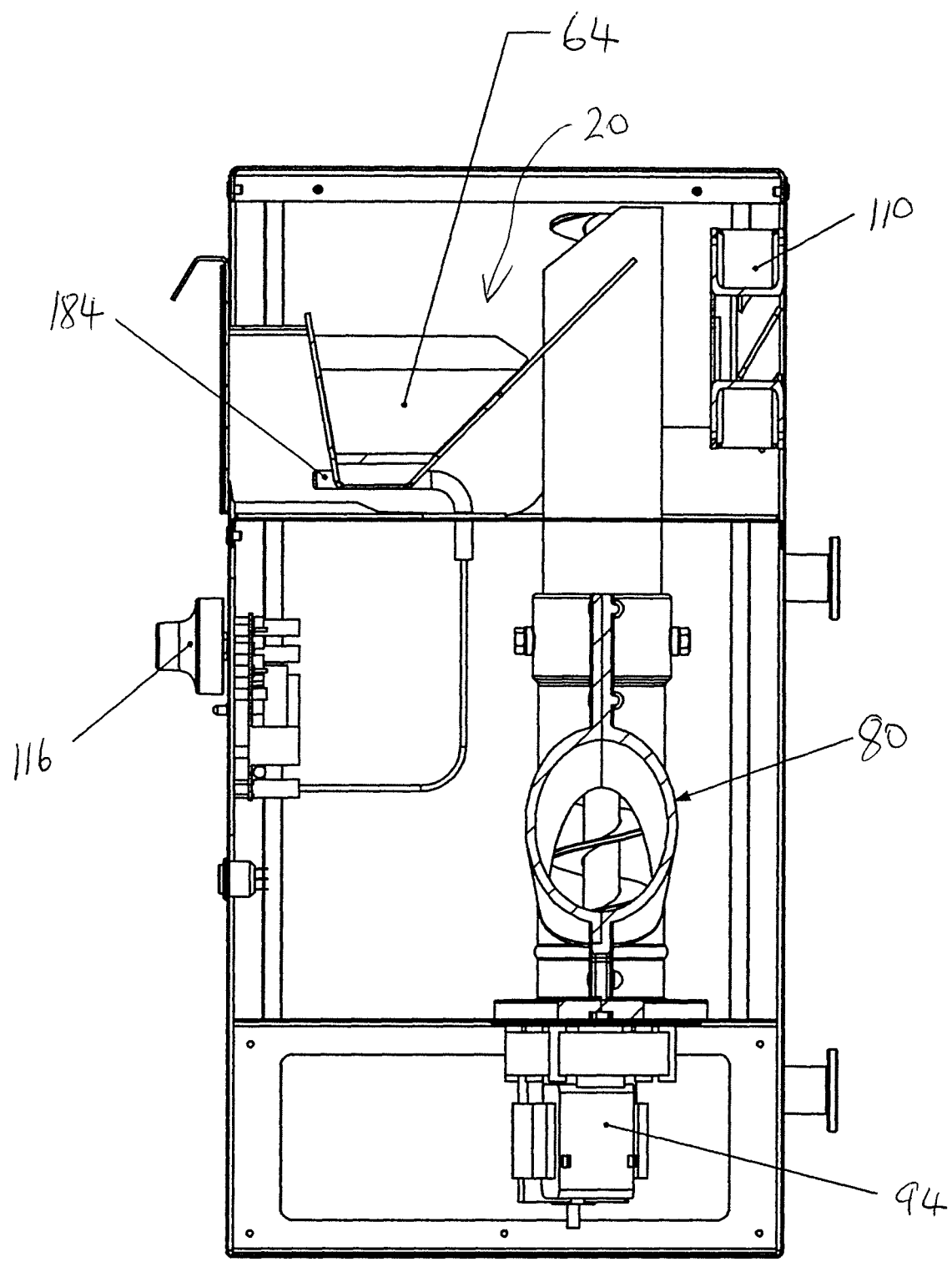
FIG. 34 is a cross-sectional view of grill similar to that of FIG. 25 and showing an alternative embodiment where the pilot light 86 of the gas igniter is replaced by an electric heating cartridge 184.

In FIG. 34 is shown a cross-sectional view of grill similar to that of FIG. 25 and showing an alternative embodiment where the pilot light 86 of the gas igniter is replaced at the base of the trough 64 of the pellet burner unit 20 by an electric heating cartridge 184. Such cartridges are well known for igniting the pellets and these are used to apply heat sufficient to ignite the pellets so that the combustion of the pellets if commenced and continues due to the passage of the air from the fan 110.

This embodiment also uses a heat control system 116 having all of the features previously described including those related to the formation of cold smoke in a cold smoke process using repeated intermittent activation of the heating cartridge 184 is exactly the same manner as described in relation to the gas ignition system.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A cooking grill comprising:
a container defining a combustion area;
a cooking surface over the combustion area for receiving and supporting food materials to be grilled;
a pellet burner unit disposed within the container under the cooking surface;
a pellet feeding device arranged to feed pellets into the pellet burner unit;
a fan for generating an airflow which at least in part passes through the pellet burner unit for causing combustion of the pellets in the pellet burner unit;
an igniter for the pellets;
and a heat control system for controlling the igniter and the pellet feeding device;
the heat control system being arranged for shutting the igniter off to provide cold smoking from the pellets as part of an automatic cold smoking programmed cooking method.

2. The cooking grill according to claim 1 wherein the heat control system operates to shut off the igniter after a duration of time has elapsed to provide said cold smoking.

3. The cooking grill according to claim 1 wherein there is provided a temperature sensing component arranged to detect temperature in the container and wherein the heat control system operates to shut off the igniter at a programmed temperatures to provide said cold smoking.

4. The cooking grill according to claim 1 wherein there is provided a temperature sensing component arranged to detect temperature in the container and wherein the heat control system is arranged for controlling a rate of feed of the pellets in dependence on a detected temperature.

5. The cooking grill according to claim 1 wherein the igniter is an electric heating cartridge.

6. The cooking grill according to claim 1 wherein the igniter for the pellets comprises a gas pilot light from a gas burner system.

7. The cooking grill according to claim 6 wherein the gas burner system includes gas burner unit which is separated from the pellet burner unit on one side of the pellet burner unit in the container.

8. The cooking grill according to claim 6 wherein the heat control system controls both the gas burner system and the pellet burner unit so as to increase heat from the gas burner system while reducing heat from the pellet burner unit so as to increase a level of smoke while retaining a required temperature.

9. The cooking grill according to claim 6 wherein the fan and the container are arranged to direct air throughout the container so as to spread heat around the container regardless of whether the heat is supplied by one or both of the gas burner system and the pellet burner unit.

10. The cooking grill according to claim 6 wherein the gas burner system is arranged to apply a gas flame directly to the cooking surface with no intervening briquettes over the gas burner system.

11. The cooking grill according to claim 6 wherein the pellet burner unit comprises a trough into which the pellets are fed, the trough being mounted in a movable support which can be pulled out from the container for removal.

12. The cooking grill according to claim 11 wherein the movable support slides out through a front wall of the container.

13. The cooking grill according to claim 11 wherein the trough has opposed perforated walls for passage of air from the fan.

14. The cooking grill according to claim 11 wherein the fan is fixed in the container so that the trough moves with the support away from the fan.

15. The cooking grill according to claim 11 wherein the trough defines front and rear inclined transverse walls which are spaced away from a front wall of the container.

16. The cooking grill according to claim 11 wherein the pellet feeding device is fixed in the container so that the trough moves with the support away from the pellet feeding device.

17. The cooking grill according to claim 11 wherein the pellet burner unit comprises a trough into which the pellets are fed and wherein the pellet feeding device comprises an upstanding feed tube having a pellet transfer device in the tube for feeding the pellets upwardly along the tube from below the trough.

18. The cooking grill according to claim 17 wherein the trough is mounted in a movable support which can be moved leaving the upstanding feed tube at a fixed position in the container.

19. The cooking grill according to claim 17 wherein the trough includes an inclined trough wall with a cut out shaped to partly surround the feed tube.

20. The cooking grill according to claim 6 wherein the pellet feeding device includes a removable cartridge for containing pellets and a receptacle for receiving a neck of the cartridge inserted thereon so that the cartridge supplies pellets for transfer to the pellet burner unit.

* * * * *